US006493702B1

(12) United States Patent
Adar et al.

(10) Patent No.: US 6,493,702 B1
(45) Date of Patent: Dec. 10, 2002

(54) SYSTEM AND METHOD FOR SEARCHING AND RECOMMENDING DOCUMENTS IN A COLLECTION USING SHARE BOOKMARKS

(75) Inventors: Eytan Adar, Foster City, CA (US); Thomas M. Breuel, San Jose, CA (US); Todd A. Cass, San Francisco, CA (US); James E. Pitkow, Palo Alto, CA (US); Hinrich Schuetze, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/305,844

(22) Filed: May 5, 1999

(51) Int. Cl.[7] .............................. G06F 17/30; G06F 7/00
(52) U.S. Cl. ............................................................ 707/3
(58) Field of Search ........................... 707/1, 2, 10, 104, 707/500, 3, 6, 100–104.1; 345/329, 330, 331, 332, 333–335, 352; 709/203, 217, 305

(56) References Cited

U.S. PATENT DOCUMENTS

| | | | | |
|---|---|---|---|---|
| 4,839,853 A | 6/1989 | Deerwester et al. | ........ | 364/900 |
| 5,113,340 A | 5/1992 | McWherter | ................. | 364/419 |
| 5,265,065 A | 11/1993 | Turtle | ......................... | 395/600 |
| 5,301,109 A | 4/1994 | Landauer et al. | ...... | 364/419.19 |
| 5,317,507 A | 5/1994 | Gallant | ................. | 364/419.13 |
| 5,442,778 A | 8/1995 | Pedersen et al. | ............ | 395/600 |
| 5,446,891 A | 8/1995 | Kaplan et al. | .............. | 395/600 |
| 5,526,443 A | 6/1996 | Nakayama | .................. | 382/229 |
| 5,592,375 A | 1/1997 | Salmon et al. | .............. | 395/207 |
| 5,630,125 A | 5/1997 | Zellweger | .................. | 395/614 |
| 5,638,543 A | 6/1997 | Pedersen et al. | ............ | 395/751 |
| 5,659,766 A | 8/1997 | Saund et al. | ................. | 395/759 |
| 5,687,364 A | 11/1997 | Saund et al. | ................. | 395/605 |
| 5,748,954 A | 5/1998 | Mauldin | ....................... | 395/610 |
| 5,749,081 A | 5/1998 | Whiteis | ....................... | 707/102 |
| 5,796,393 A | * 8/1998 | MacNaughton et al. | .... | 345/329 |
| 5,802,515 A | 9/1998 | Adar et al. | .................... | 707/5 |
| 5,802,516 A | * 9/1998 | Schwarts et al. | .............. | 707/6 |

(List continued on next page.)

FOREIGN PATENT DOCUMENTS

EP  1030247 A2 * 8/2000  ........... G06F/17/24

OTHER PUBLICATIONS

Eytan Adar, *Hybrid–Search and Storage of Semi–structured, Information*, Master's Thesis of Eytan Adar submitted to the Department of Electrical Engineering and Computer Science, May 22, 1998, pp. 2–122.

(List continued on next page.)

*Primary Examiner*—John Breene
*Assistant Examiner*—Linh Black

(57) ABSTRACT

A search and recommendation system employs the preferences and profiles of individual users and groups within a community of users, as well as information derived from shared document bookmarks, to augment Internet searches, re-rank search results, and provide recommendations for documents based on a subject-matter query. The search and recommendation system operates in the context of a shared bookmark manager, which stores individual users' bookmarks (some of which may be published or shared for group use) on a centralized bookmark database connected to the Internet. The shared bookmark manager is implemented as a distributed program, portions of which operate on users' terminals and other portions of which operate on the centralized bookmark database.

67 Claims, 14 Drawing Sheets

U.S. PATENT DOCUMENTS

| | | | | |
|---|---|---|---|---|
| 5,813,007 A | * | 9/1998 | Nielsen | 707/10 |
| 5,835,905 A | | 11/1998 | Pirolli et al. | 707/3 |
| 5,847,708 A | | 12/1998 | Wolff | 345/349 |
| 5,875,446 A | * | 2/1999 | Brown et al. | 707/3 |
| 5,907,845 A | * | 5/1999 | Cox et al. | 707/102 |
| 5,909,207 A | * | 6/1999 | Ho | 345/156 |
| 5,918,010 A | | 6/1999 | Appleman et al. | 395/200.33 |
| 5,918,014 A | * | 6/1999 | Robinson | 706/12 |
| 5,924,105 A | | 7/1999 | Punch III et al. | 707/513 |
| 6,005,568 A | * | 12/1999 | Simonoff et al. | 345/335 |
| 6,029,172 A | | 2/2000 | Jorna et al. | 707/102 |
| 6,029,175 A | * | 2/2000 | Chow et al. | 707/10 |
| 6,032,162 A | * | 2/2000 | Burke | 707/501 |
| 6,037,934 A | | 3/2000 | Himmel | 345/335 |
| 6,041,311 A | | 3/2000 | Chislenko et al. | 705/27 |
| 6,049,812 A | * | 4/2000 | Bertram et al. | 707/516 |
| 6,052,714 A | * | 4/2000 | Miike et al. | 709/217 |
| 6,055,508 A | * | 4/2000 | Naor et al. | 705/11 |
| 6,085,226 A | | 7/2000 | Horvitz | 709/203 |
| 6,092,049 A | | 7/2000 | Chislenko et al. | 705/10 |
| 6,098,065 A | * | 8/2000 | Skillen et al. | 707/3 |
| 6,100,890 A | * | 8/2000 | Bates et al. | 345/357 |
| 6,138,128 A | * | 10/2000 | Perkowitz et al. | 707/501.1 |
| 6,185,598 B1 | * | 2/2001 | Farber et al. | 709/200 |

OTHER PUBLICATIONS

Eytan Adar, *Haystack: A Personal, Intelligent, Indexing System,* Project Haystack, Laboratory for Computer Science and Artificial Intelligence Laboratory, Massachusetts Institute of Technology, Cambridge, MA 02139, pp. 1–24.

Eytan Adar and Jeremy Hylton, *On–the–fly Hyperlink Creation for Page Images,* Library 2000, M.I.T. Laboratory for Computer Science (4 pages).

Eytan Adar and Bernardo A. Huberman, *The Economics of Surfing,* Xerox Palo Alto Research Center, Palo Alto, California 94304 (pp. 1–14).

Eytan Adar, David Karger, and Lynn Andrea Stein, *Haystack: Per–User Information Environments,* CIKM;99 1199 Kansas City, MO, USA ©1999 ACM 1–58113–146–1/99/0010, pp. 413–422.

* cited by examiner

SYSTEM AND METHOD FOR SEARCHING AND RECOMMENDING DOCUMENTS IN A COLLECTION USING SHARE BOOKMARKS

FIELD OF THE INVENTION

The invention relates to the field of information searching and browsing, and more particularly to a system and method for enhancing searches and recommending documents in a collection through the use of bookmarks shared among a community of users.

BACKGROUND OF THE INVENTION

Computer users are increasingly finding navigating document collections to be difficult because of the increasing size of such collections. For example, the World Wide Web on the Internet includes millions of individual pages. Moreover, large companies' internal Intranets often include repositories filled with many thousands of documents.

It is frequently true that the documents on the Web and in Intranet repositories are not very well indexed. Consequently, finding desired information in such a large collection, unless the identity, location, or characteristics of a specific document are well known, can be much like looking for a needle in a haystack.

The World Wide Web is a loosely interlinked collection of documents (mostly text and images) located on servers distributed over the Internet. Generally speaking, each document has an address, or Uniform Resource Locator (URL), in the exemplary form "http://www.server.net/directory/file.html". In that notation, the "http:" specifies the protocol by which the document is to be delivered, in this case the "HyperText Transport Protocol." The "www.server.net" specifies the name of a computer, or server, on which the document resides; "directory" refers to a directory or folder on the server in which the document resides; and "file.html" specifies the name of the file.

Most documents on the Web are in HTML (HyperText Markup Language) format, which allows for formatting to be applied to the document, external content (such as images and other multimedia data types) to be introduced within the document, and "hotlinks" or "links" to other documents to be placed within the document, among other things. "Hot-linking" allows a user to navigate between documents on the Web simply by selecting an item of interest within a page. For example, a Web page about reprographic technology might have a hotlink to the Xerox corporate web site. By selecting the hotlink (often by clicking a marked word, image, or area with a pointing device, such as a mouse), the user's Web browser is instructed to follow the hotlink (usually via a URL, frequently invisible to the user, associated with the hotlink) and read a different document.

Obviously, a user cannot be expected to remember a URL for each and every document on the Internet, or even those documents in a smaller collection of preferred documents. Accordingly, navigation assistance is not only helpful but necessary.

Modern Web browsers (software applications used to view and navigate documents on the Web) have introduced the concept of "bookmarks" or "favorites" (collectively referred to as "bookmarks" in this document). Bookmarks allow a user to identify which documents he would like to keep track of. The user's local machine then keeps track of the URLs for those sites, allowing the user to reload and view the sites' contents at any desired time. Bookmarks can be thought of as "pointers" to content on the Web, each specifying an address that identifies the location of the desired document, but not including the document's content (except, perhaps, in a descriptive title of the document).

In current versions of Netscape Navigator (specifically, at least versions 3.x and 4.x), a user's bookmarks are stored and maintained in a special HTML file stored on the user's local machine. This file includes a list of sites represented as title and URL pairs (in a user-defined hierarchy, if desired). The user's entire set of bookmarks is contained within a single HTML file.

Recent versions of Microsoft's Internet Explorer (at least versions 3.x–5.x) store user bookmarks (or "favorites," using Microsoft's preferred terminology) as individual files on the local machine's file system. Each favorite is a small file containing the site's URL, while the favorite's title is stored as the filename.

Other browsers' bookmarks are frequently stored as entries in a custom configuration file, in which each site's title is paired with a URL.

None of the foregoing browsers permit much sophisticated user of a user's collection of bookmarks, although some limited manipulations are possible. For example, it is usually possible to create and modify a hierarchy of bookmarks (including sorting and moving existing bookmarks around within the hierarchy); to modify the titles paired with the URLs, to search for words within the titles or URLs; and often to derive some additional information about the bookmarks, such as the date and time of the user's most-recent visit to the site, the collected number of visits, and possibly other information.

In typical use, the bookmark facilities of Web browsers act as a "filter" for those documents a particular user finds to be important or useful While a user might view hundreds of Web pages in a day, only a few of those are typically found to provide useful information. If that information is expected to be useful again in the future, the user will often set a bookmark for those pages. This is a useful way for users to be able to access the Internet; however, traditional bookmarks have the distinct limitation that they are only useful to the extent a user has seen the sites before, since adding a bookmark to a collection is a manual act, typically performed when either the desired page is already being viewed or a URL has been manually received from another person.

Most notably, the known traditional bookmark systems are single-user. Of course (particularly with Netscape Navigator, in which bookmarks already exist in an HFML file), bookmarks can be exported to a public web page, allowing others to view and use the bookmarks, but that in itself does not provide any additional functionality.

Accordingly, when a user desires to find information on the Internet (or other large network) that is not already represented in the user's bookmark collection, the user will frequently turn to a "search engine" to locate the information. A search engine serves as an index into the content stored on the Internet There are two primary categories of search engines: those that include documents and Web sites that are analyzed and used to populate a hierarchy of subject-matter categories (e.g., Yahoo), and those that "crawl" the Web or document collections to build a searchable database of terms, allowing keyword searches on page content (such as AltaVista, Excite, and Infoseek, among many others).

Also known are recommendation systems, which are capable of providing Web site recommendations based on criteria provided by a user or by comparison to a single preferred document (e.g., Firefly, Excite's "more like this" feature).

"Google" (www.google.com) is an example of a search engine that incorporates several recommendation-system-like features. It operates in a similar manner to traditional keyword-based search engines, in that a search begins by the user's entry of one or more search terms used in a pattern-matching analysis of documents on the Web. It differs from traditional keyword-based search engines (such as AltaVista), in that search results are ranked based on a metric of page "importance," which differs from the number of occurrences of the desired search terms (and simple variations upon that theme).

Google's metric of importance is based upon two primary factors: the number of pages (elsewhere on the Web) that link to a page (i.e., "inlinks," defining the retrieved page as an "authority"), and the number of pages that the retrieved page links to (i.e., "outlinks," defining the retrieved page as a "hub"). A page's inlinks and outlinks are weighted, based on the Google-determined importance of the linked pages, resulting in an importance score for each retrieved page. The search results are presented in order of decreasing score, with the most important pages presented first. It should be noted that Google's page importance metric is based on the pattern of links on the Web as a whole, and is not limited (and at this time cannot be limited) to the preferences of a single user or group of users.

Another recent non-traditional search engine is IBM's CLEVER (CLient-side EigenVector Enhanced Retrieval) system. CLEVER, like Google, operates like a traditional search engine, and uses inlinks/authorities and outlinks/hubs as metrics of page importance. Again, importance (based on links throughout the Web) is used to rank search results. Unlike Google, CLEVER uses page content (e.g., the words surrounding inlnks and outlinks) to attempt to classify a page's subject matter. Also, CLEVER does not use its own database of Web content; rather, it uses an external hub, such as an index built by another search engine, to define initial communities of documents on the Web. From hubs on the Web that frequently represent people's interests, CLEVER is able to identify communities, and from those communities, identify related or important pages.

Direct Hit is a service that cooperates with traditional search engines (such as HotBot), attempting to determine which pages returned in a batch of results are interesting or important, as perceived by users who have previously performed similar searches. Direct Hit tracks which pages in a list of search results are accessed most frequently; it is also able to track the amount of time users spend at the linked sites before returning to the search results. The most popular sites are promoted (i.e., given higher scores) for future searches.

Alexa is a system that is capable of tracking a user's actions while browsing. By doing so, Alexa maintains a database of users' browsing histories. Page importance is derived from other users' browsing histories. Accordingly, at any point (not just in the context of a search), Alexa can provide a user with information on related pages, derived from overall traffic patterns, link structures, page content, and editorial suggestions.

Knowledge Pump, a Xerox system, provides community-based recommendations by initially allowing users to identify their interests and "experts" in the areas of those interests. Knowledge Pump is then able to "push" relevant information to the users based on those preferences; this is accomplished by monitoring network traffic to create profiles of users, including their interests and "communities of practice," thereby refining the community specifications. However, Knowledge Pump does not presently perform any enhanced search and retrieval actions like the search-engine-based systems described above.

While the foregoing systems and services blend traditional search engine and recommendation system capabilities to some degree, it should be recognized that none of them are presently adaptable to provide search-engine-like capabilities while taking into account the preferences of a smaller group than the Internet as a whole. In particular, it would be beneficial to be able to incorporate community-based recommendations into a system that is capable of retrieving previously unknown documents from the Internet.

SUMMARY OF THE INVENTION

The present system and method facilitate searching and recommending resources, or documents, based upon a collection of user document preferences shared by a large group of users. The invention leverages several of the key properties of document collections: only valuable documents are bookmarked; documents are usually categorized into a hierarchy; and documents can be shared. In a preferred embodiment, the present system combines some attributes of bookmark systems, as discussed above, with some attributes of search engines and recommendation systems, also discussed above.

The present system and method maintain a centralized database of bookmarks or user document preferences. This centralized database is maintained as a hierarchy, with individual users' bookmarks maintained separately from other users' bookmarks. However, the maintenance of the centralized database facilitates harnessing the power and flexibility of being able to use, in various ways, all users' public bookmarks and the information contained in and referenced by those bookmarks.

The system and method of the present invention allows for several operations to be performed, including enhanced search and retrieval, enhanced subject-matter-based recommendation generation (for both documents and groups), and automatic document categorization and summarization.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
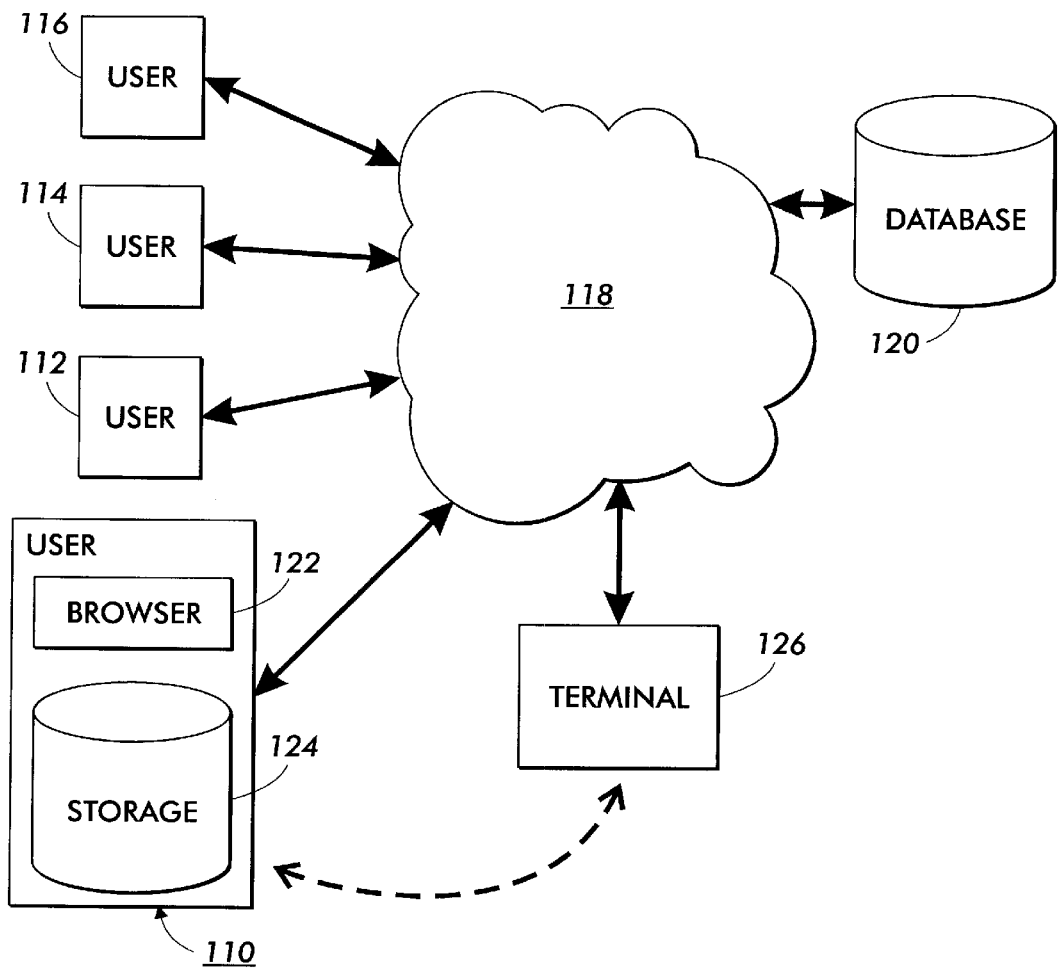
FIG. 1 is a block diagram illustrating the physical aspects of the invention, namely several users in communication with the Internet.

A bookmark system according to the present invention can be implemented as set forth in FIG. 1. The exemplary system includes at least one user 110, and typically a plurality of users 110, 112, 114, and 116. Each user 110–116 is coupled to a document repository 118, such as the Internet (or the World Wide Web), a corporate Intranet, a library, or any other collection of documents. Documents, in this context, refers to any data file containing information readable by a machine or a human; the term includes (but is not limited to) text files, formatted text files, bitmapped image files (including images representing text-based documents), vector-based image files, sound files, multimedia files, and any other data files of possible interest. Documents may be static or dynamically generated based on information in the URL or other request presented to access the document as well as other contextual information, such as the time of day. The repository 118 may be situated on distributed servers such as Web servers on the Internet, a single group of dedicated servers such as a corporate information center, or a single host server.

Also in communication with the repository 118 (and the users 110–116) is a bookmark database 120. As described in the summary set forth above, the bookmark database 120 maintains a set of bookmarks for each user 110–116; each user may maintain private bookmarks, which are shielded by the database 120 from the other users, as well as public bookmarks, which are made available by the database 120 for various uses by other users. The specific operation of the bookmark database 120 will be set forth in additional detail below.

A user's primary interaction with the bookmark database 120 takes place through a main bookmark window 210 (FIG. 2) provided by the user's browser 122 (FIG. 1). The illustrated bookmark window 210 includes a list of bookmarks 212, a list of categories 213, the user's screen name "cwixon" 214, and several cosmetic separators 216. A data entry area 218 is also provided, and will be discussed in further detail below.

The user 110 can access bookmarks within the list 212 in several possible ways. By "clicking" on the text of a single bookmark (e.g., the White House bookmark 220), the user's browser 122 will open a new window and bring up the document referenced by the bookmark 220, in this case the White House's Web site. By "dragging" the bookmark 220 into an existing browser window, the browser 122 will bring up the document in that window. In either case, the system, in its preferred embodiment, logs the event of accessing the bookmark 220 to facilitate tracking frequency and recency of use for all bookmarks.

In the left side of the main bookmark window 210 next to the list of bookmarks 212, there are three columns 222, 224, and 226 for informational icons representing whether the documents corresponding to each bookmark are available, relatively new, or popular. In the illustrated embodiment of the invention, the first column 222 is reserved for an icon representing that a particular document is presently unavailable. For example, an unavailability icon 228 is shown next to the "This is a Bad Link" bookmark; the system is able to alert the user that no such document exists without the need for the user to manually verify the site's availability. In one embodiment of the invention, the system is able to recommend alternative documents when a preferred document is unavailable; that capability will be discussed in further detail below.

The second column 224 is reserved for an icon representing that a particular document is new or has been revised within the last thirty days. For example, a newness icon 230 is shown next to the Infoseek bookmark; the presence of that icon in the presently implemented and illustrated embodiment tells the user that the Infoseek main page (the one referenced by the bookmark) has been updated recently, within the last thirty days. In an alternative embodiment of the invention, the newness icon 230 can be used in combination with the recency-of-access tracking performed by the invention, thereby alerting the user that a document has been updated since the user last accessed or viewed the document.

The third column 226 is reserved for an icon representing the popularity of a particular document. In the illustrated embodiment, a popularity icon 232 is shown next to the AltaVista bookmark because that bookmark is present in over 50% of all users' bookmark collections. The popularity icon 232 can thus be an indication of the quality of the information likely to be found in the document, since other users are also relying upon it. Although the currently implemented and illustrated embodiment uses 50% (over all users) as the popularity threshold, it should be noted that other thresholds might also be usable, as this number is used simply for convenience. In alternative embodiments of the invention, the threshold percentage may be made a user-definable preference, or may be based on some other metric (such as the percentage over a specified group of users).

In a preferred embodiment of the invention, the meaning of each icon is explained via a pop-up message when the user's mouse pointer (or other selection tool) is positioned over the icon. For example, by positioning the mouse pointer over the unavailability icon 228, a "Document Unavailable" message would be presented to the user.

The icons in columns 222, 224, and 226 are presented to each user on the basis of information tracked and maintained by the bookmark database 120. The database 120 tracks availability and newness for each bookmark in the background, without user intervention, to achieve some efficiencies that would not otherwise be possible when each user maintains a separate local collection of bookmarks. Specifically, and particularly in the case of popular bookmarks, the information on availability and newness can be updated for the benefit of plural users at one time through one simple attempted access operation by the bookmark database 120. For example, it is likely that many (or even all) of the users of the system will have a bookmark for "Yahoo!" The availability and newness of that site can be tracked once by the database 120; the information can then be propagated to each user through multiple instances of the main bookmark window 210. The background operations of the database 120 will be discussed in further detail below, in connection with FIG. 13.

Figure 2:
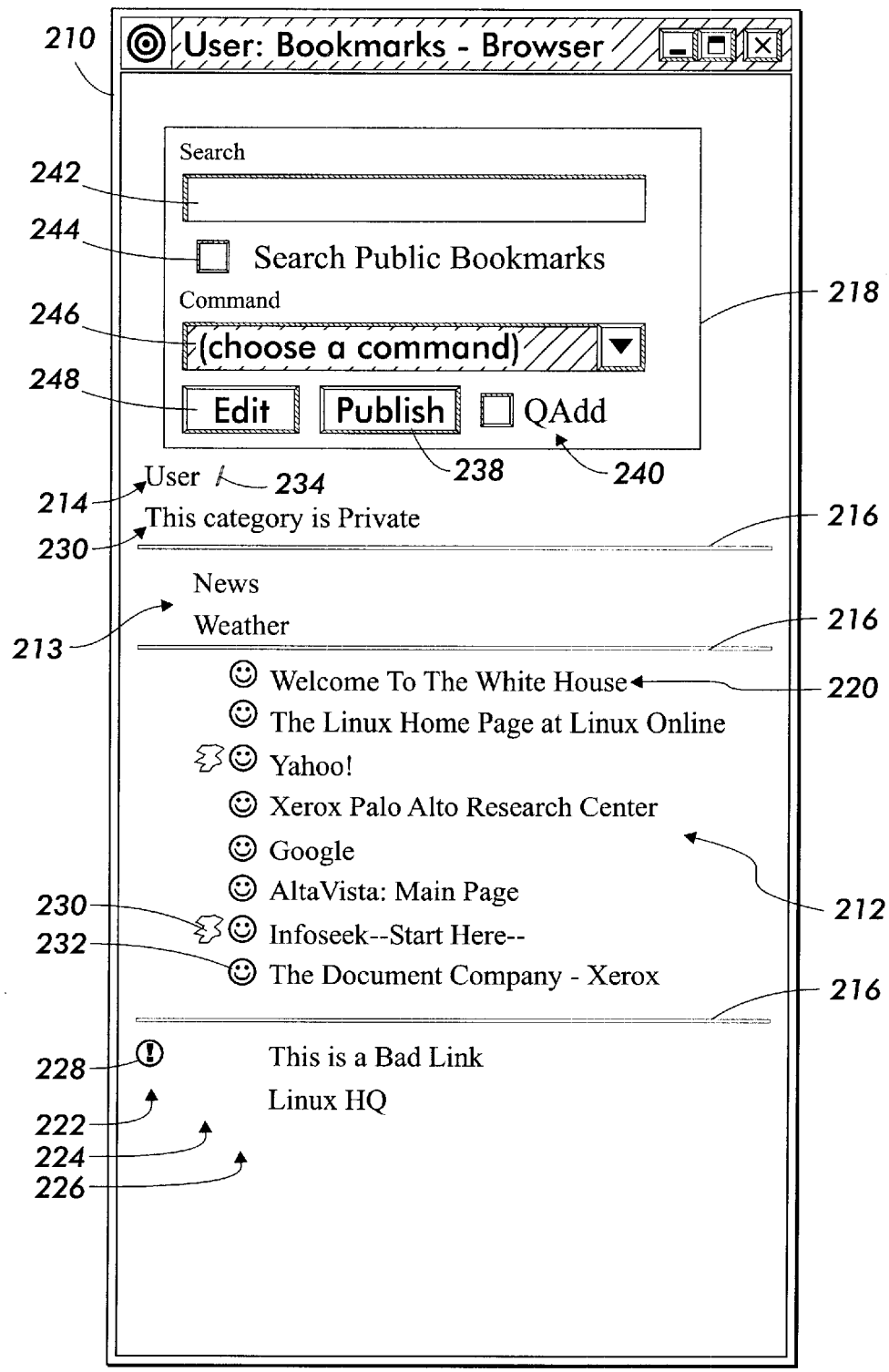
FIG. 2 is a representation of the user interface presented by the main bookmark window of a system according to the invention.

As suggested above, a user's bookmarks can be divided into categories (such as the categories in the list 213); the list 212 shown in FIG. 2 is the "top level" list in user cwixon's hierarchy, as illustrated by the "slash" 234 presented after the user's screen name 214. This is consistent with the traditional Unix-like method for specifying hierarchies of directories, in which a slash character alone represents the root or top-level directory. The user 110 can access the other categories in the list 213 by clicking on those category names. When that is done, the list of bookmarks 212 will be replaced with a different list taken from the chosen category (such as News or Weather in the illustrated example), and the slash 234 will be followed by the name of the chosen category. After descending the hierarchy, the user 110 can return to the top level (or any intermediate level) by clicking on the screen name 214 or any following category name.

The main bookmark window 210 contains a notation 236 that the displayed category (in this case, the top-level category) is private. When that is the case, only the user 110 that owns (i.e., contributed) the list 212 can access those bookmarks. By selecting a "Publish" button 238 in the data entry area 218, the user 110 can make those bookmarks available to all users; otherwise, the bookmarks in the category remain private. In a preferred embodiment of the invention, a user can choose to publish any category of bookmarks (or even a single bookmark or selection of bookmarks) to the community of users as a whole, or only to selected groups of users. The concept of groups will be described in further detail below.

Although the exemplary main bookmark window 210 shows the bookmarks for a single user, in a preferred embodiment of the invention, it is also possible to browse, view, and use public bookmarks, either as an entire categorized collection, or broken down via groups of users.

Several other options are available in the main bookmark window 210. A "quick add" option 240 is available; when selected, any URL or document location dragged into the window 210 will be immediately added to the list 212 without any intermediate confirmation step. The ordinary "add" function of the main bookmark window 210 will cause a confirmation window (FIG. 5, described below) to appear before a bookmark is added via the drag-and-drop method.

A search text-entry box 242 is also provided in the data entry area 218. By typing one or more keywords into the text-entry box 242 and pressing "Enter," the system will search for bookmarks containing (either in the title or in the URL) the requested keywords. By selecting a "Search Public Bookmarks" option 244, the search can be extended to all users' public bookmarks (see FIG. 4, described below).

Figure 3:
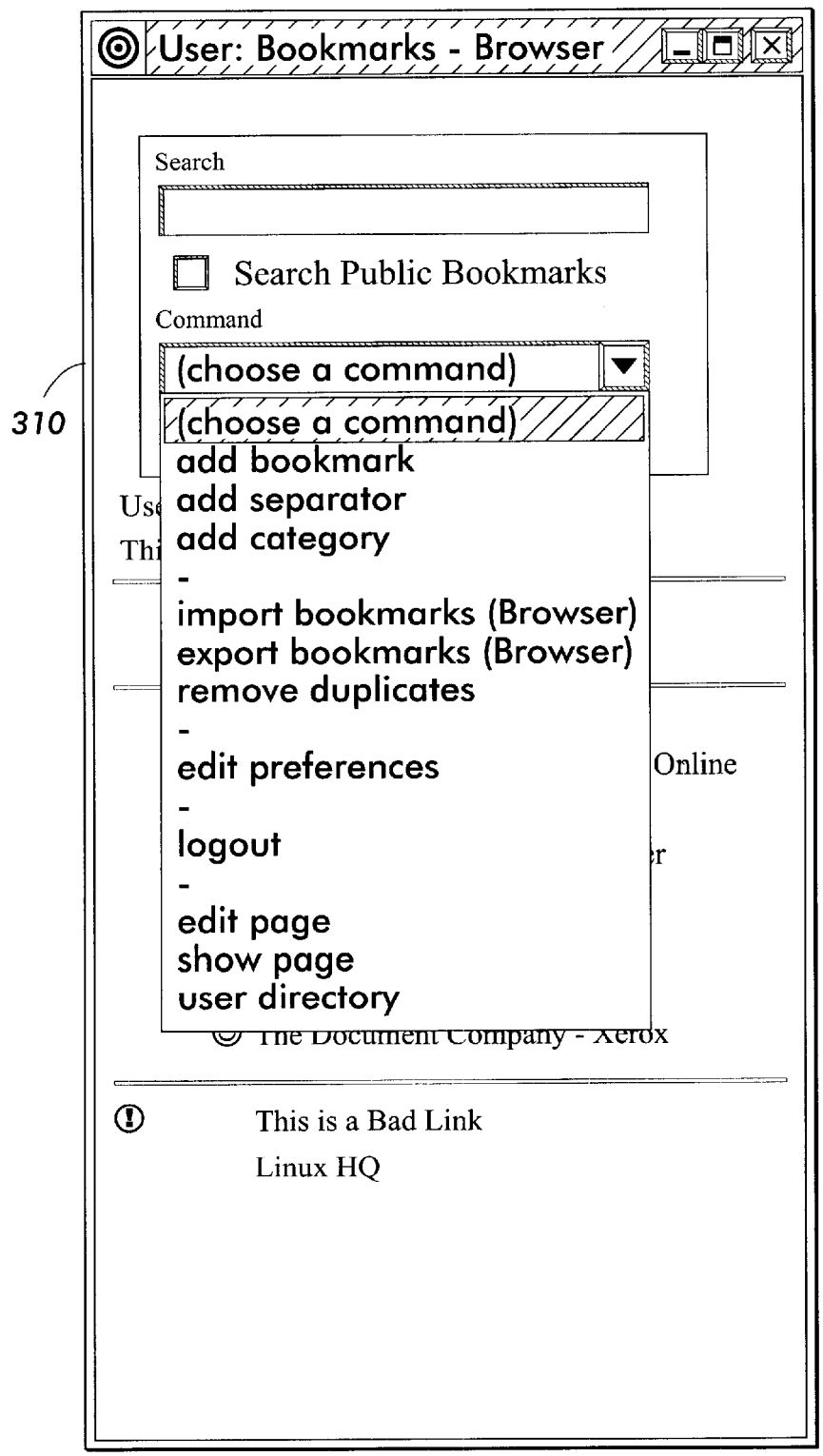
FIG. 3 is an alternate view of the user interface of FIG. 2, in which the command entry listbox is expanded to show several available commands for the system.

The main bookmark window 210 also provides a command selection drop-down listbox 246; the contents of the command selection listbox 246 are shown in FIG. 3. By selecting various options in the listbox 246, the user can add bookmarks, separators, and categories; import and export bookmarks between the bookmark system of the invention and, for example, Netscape's internal bookmark system (described in the background section above), edit the user's preferences (such as password, e-mail address, etc.); log out of the system; edit a document; show a document (ordinarily performed by simply clicking or dragging a bookmark, as described above); or show a directory of users (used to access a particular user's public bookmarks).

The functions available in the command selection drop-down listbox 246, as illustrated in the window 310 of FIG. 3, involve simple data manipulation and will not be described in further detail (except in the context of the general operation of the system in FIGS. 9–12). These functions would be easily implemented by a person of ordinary skill in the art of Web-based application programming.

Figure 4:
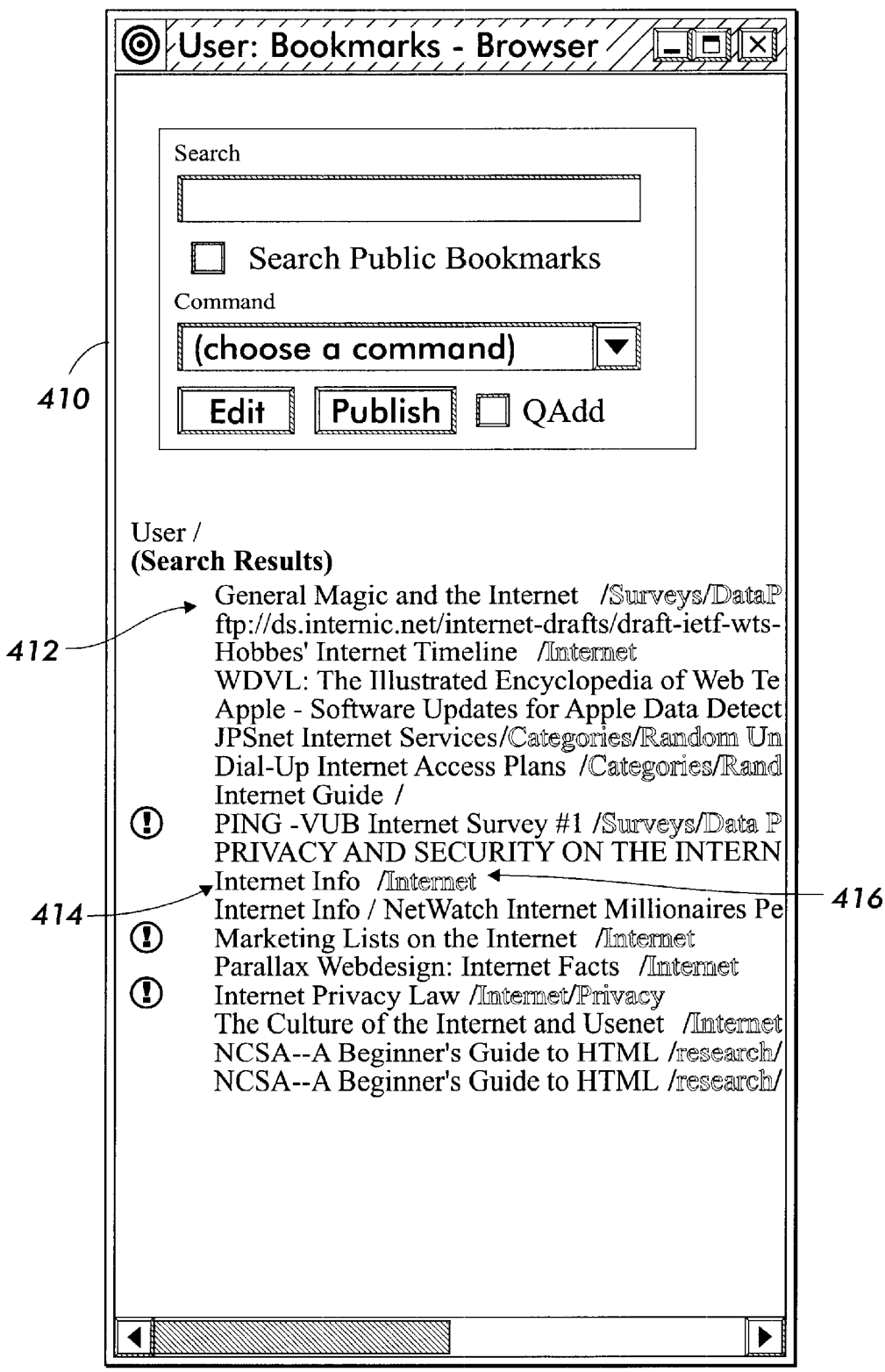
FIG. 4 is a representation of the user interface presented by a search results window of a system according to the invention.

As stated above, FIG. 4 is a search results window 410 illustrating a sample set of search results; the keyword entered into the text entry box 242 in the illustrated embodiment was "internet." Accordingly, the search results window 410 includes a list 412 of bookmarks containing, either in the title or URL, the word "internet." The exemplary search was performed with the "Search Public Bookmarks" option 244 selected, so the list 412 can include bookmarks from all users. The category in which each bookmark in the list 412 was found is presented next to the corresponding bookmark. For example, an "Internet Info" bookmark 414 was found in some user's "Internet" category; for privacy reasons, the user's identity is concealed. As with the main bookmark window 210, the user can click or drag bookmarks from the search results window 410 to access the documents referenced by the bookmarks in the list 412.

Figure 5:
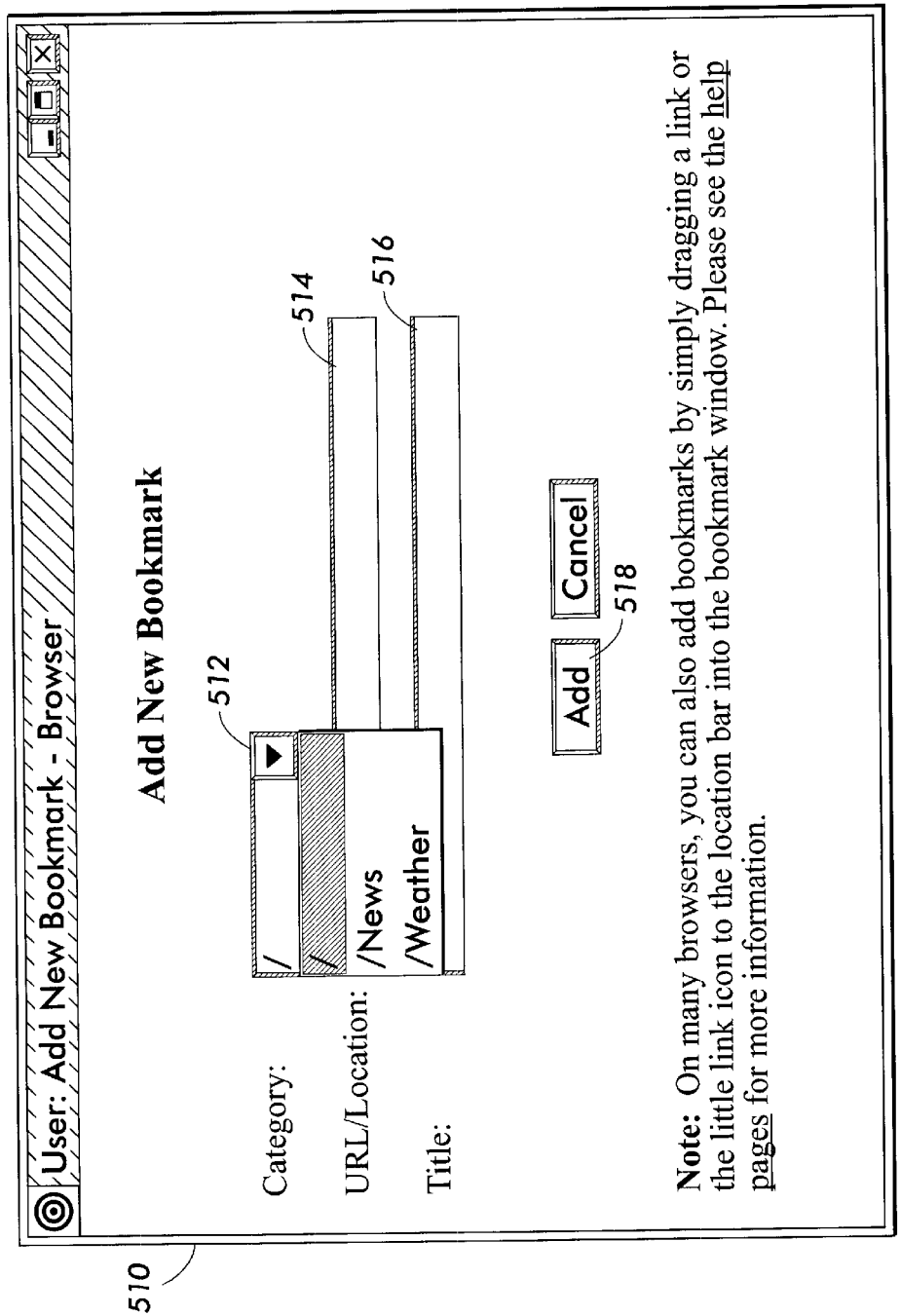
FIG. 5 is a representation of the user interface presented by an "Add New Bookmark" window of a system according to the invention.

FIG. 5 illustrates an "Add New Bookmark" window 510 used by the user interface of the presently implemented embodiment of the invention. As shown, in its empty form, this window 5 10 is accessed by selecting the "add bookmark" command from the command selection listbox 246 (FIG. 2). The user 110 can then manually select a category 512 in which to add the bookmark, enter the URL or other identifier 514 for the bookmark, and enter a title 516 for the bookmark. An "Add" button 518 is provided, and when chosen, the bookmark system adds the specified bookmark to the list 212. When the "Add New Bookmark" window 510 is accessed by dragging a link onto the main bookmark window 210, the category field 512 and URL field 514 are already filled in, and can be edited by the user if desired before confirming the action by pressing the "Add" button 518.

Figure 6:
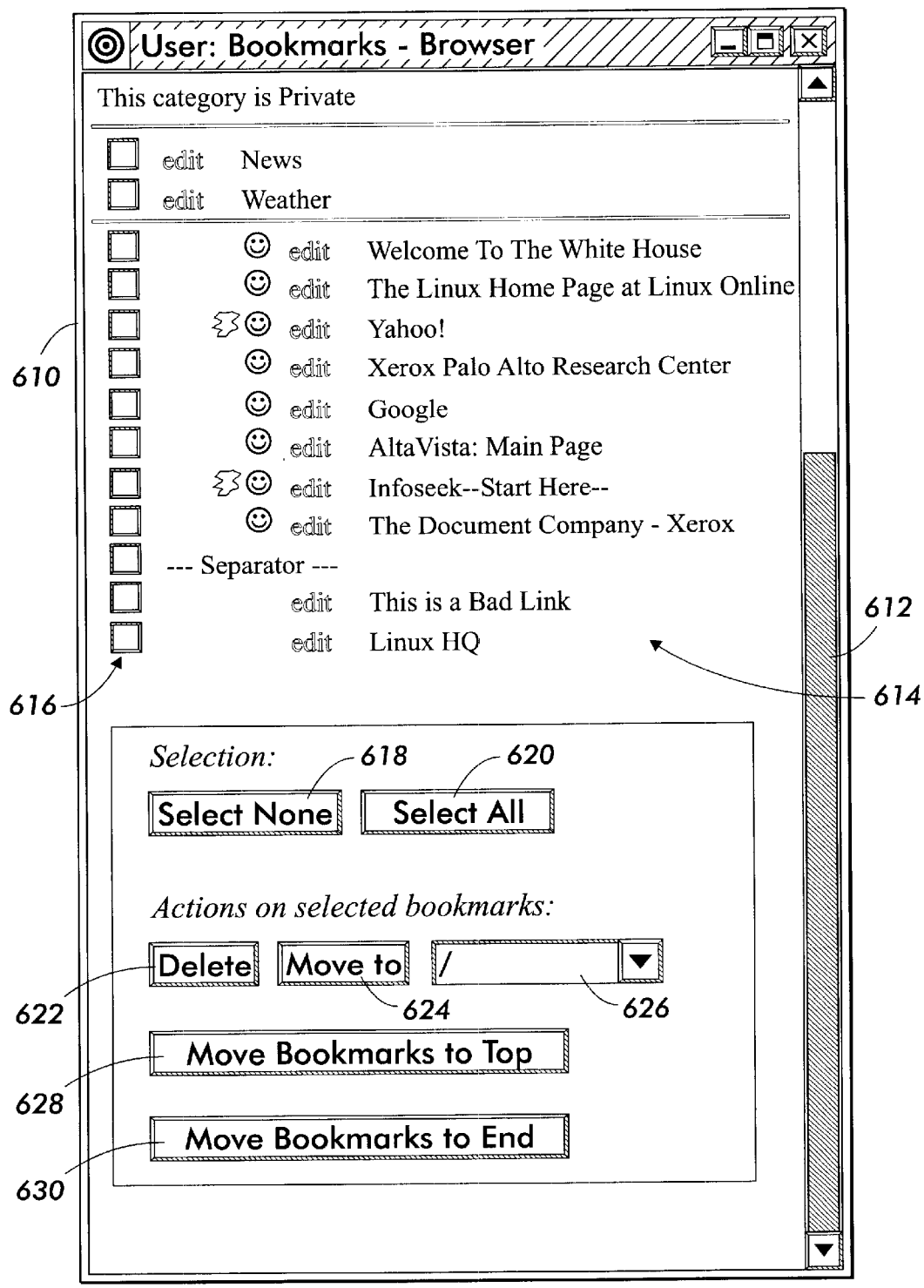
FIG. 6 is a representation of the user interface presented by a bookmark editing window of a system according to the invention.

FIG. 6 represents a bookmark editing window 610 presented by the user interface of the presently implemented embodiment of the invention. This window 610 is accessed by pressing an "Edit" button 248 in the main bookmark window 210 (FIG. 2). As shown (and as represented by a scrollbar 612 on the right side of the window 610, the editing window 610 has been scrolled down to reveal the bottom of the window; the top (not seen) includes the data entry area 218 (FIG. 2).

A list 614 of bookmarks to be edited is presented within the editing window 610; the bookmarks are preceded by a column of checkboxes 616 available to indicate which bookmarks are to be edited. By selecting a "Select None" button 618 or a "Select All" button 620, none or all of the checkboxes 616 will be selected, respectively. Editing operations, as indicated by the remaining buttons within the editing window 610, can then be performed on the selected bookmarks. For example, after selecting one or more bookmarks, pressing a "Delete" button 622 will remove the selected bookmarks from the list 614 (and from the list 212 in the main bookmark window 210). A "Move to" button 624 and corresponding category selection listbox 626 are provided to move one or more selected bookmarks to a different category. Finally, a "Move Bookmarks to Top" button 628 and a "Move Bookmarks to Bottom" button 630 are provided to facilitate moving one or more selected bookmarks around within the displayed category. As with the commands shown in the listbox 246, these editing commands will not be discussed in further detail, as they represent simple data manipulation operations easily implemented by a person of ordinary skill in the art.

As suggested in the summary section above, the present invention harnesses the power of online communities to allow enhanced search-and-retrieval and recommendation operations. These operations are enhanced through the use of data derived from a collection of users' shared bookmarks.

Millions of people use and participate in the Internet today. However, these users have many diverse interests. For example, some users might have a particular interest in financial information, while some other users might be interested in computer programming, and still other users are interested in video games. While traditional search engines are able to search the Internet as a whole, it is not usually possible to derive information from the various communities of users around the Internet. Systems such as Google, CLEVER, Direct Hit, and Alexa attempt to derive some additional information from aggregate interests manifested on the Internet as a whole, but are generally unable to derive any information from the preferences of select individuals or groups.

Figure 7:
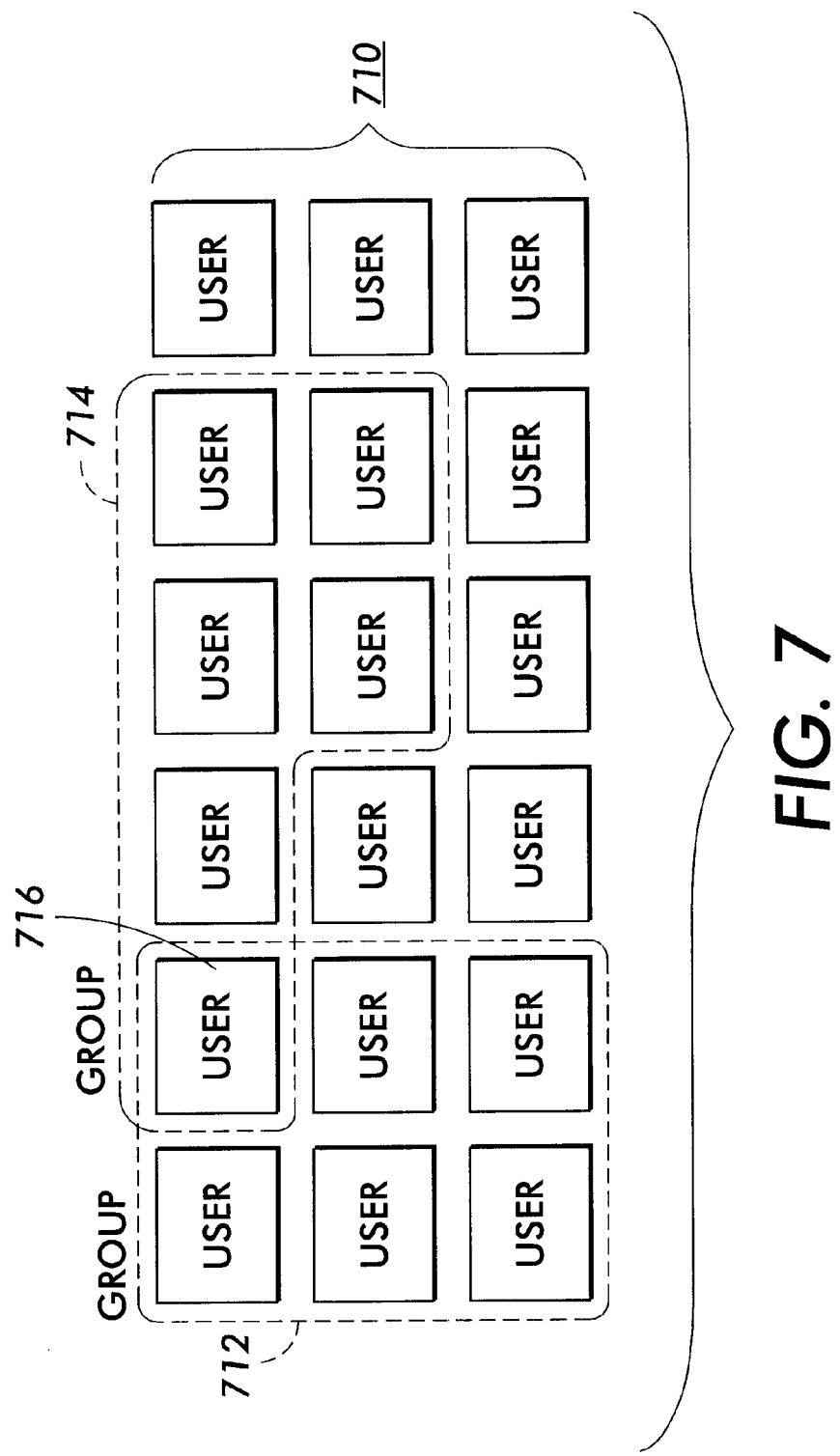
FIG. 7 is a representative schematic diagram illustrating the relationships among all possible users of a system according to the invention, groups selected from the users, and individual users.

The present invention uses communities of users as follows. In FIG. 7, the millions of users participating in the Internet are represented by eighteen representative users 710. Two groups 712 and 714 are highlighted. A first group 712 contains six users; for the purposes of this example, suppose that the first group 712 is interested in financial information. A second group 714 also contains six users; for exemplary purposes, suppose that the second group 714 is interested in computer programming. It should be noted that the groups need not be (and in this example are not) mutually exclusive, as one user 716 is a member of both the first group 712 and the second group 714. Moreover, not every user must have a defined interest. The present invention is able to use the preferences of the entire Internet 710, one or more groups 712 or 714, or even a single user 716 to provide recommendations on preferred documents and to enhance search queries and results. The operations performed in doing so will be described in further detail below in conjunction with FIGS. 14 and 15.

Figure 8:
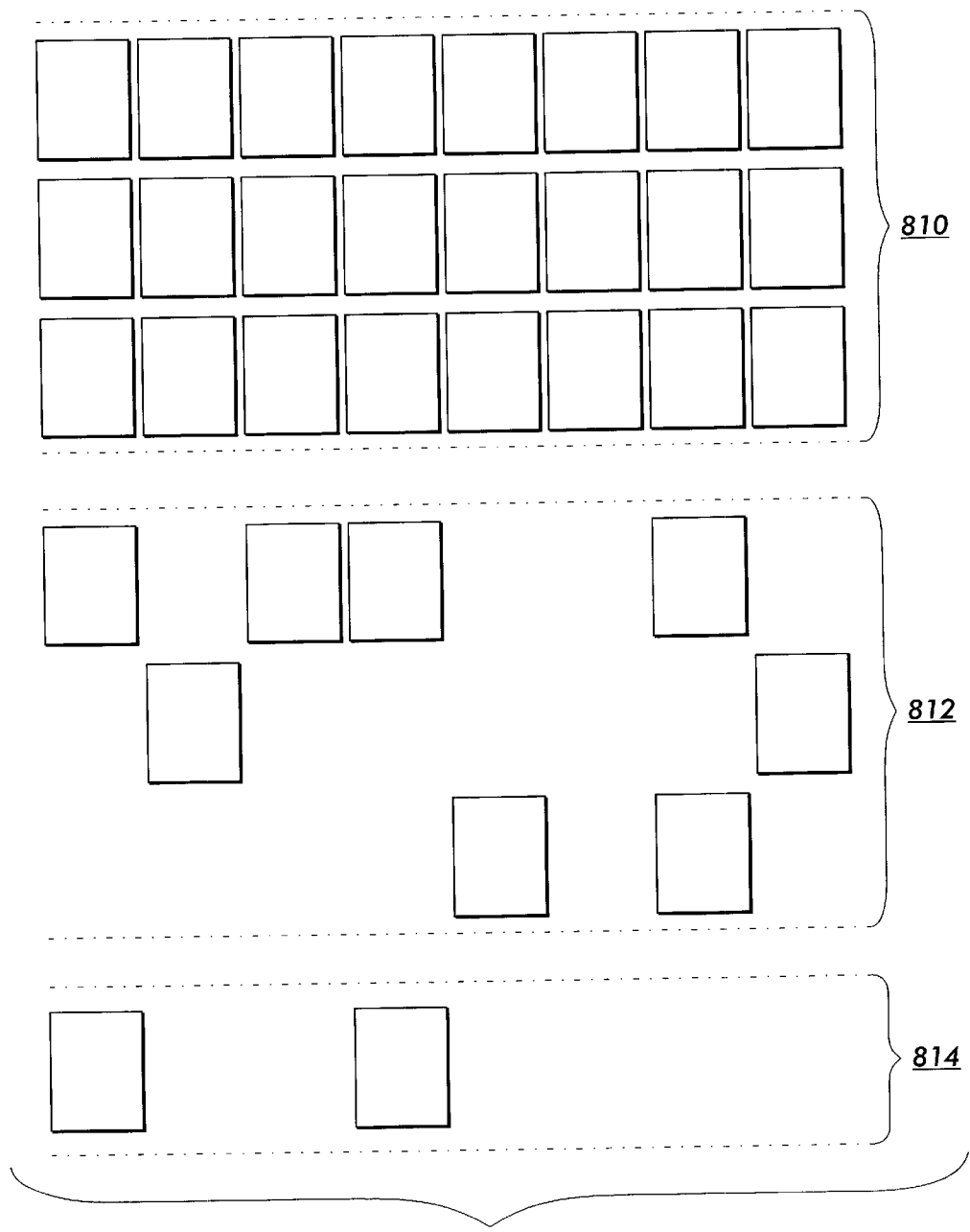
FIG. 8 is a representative schematic diagram illustrating the relationships among all possible documents on the Internet, a viewed selection of documents, and a typical set of bookmarked documents.

FIG. 8 illustrates schematically a similar breakdown of documents on the Internet. The millions of documents available on the Internet are represented by 24 exemplary documents 810. While there are many, many documents available, only a small portion of them 812 are typically used or accessed by a community of users. And of those accessed, only a small number are preferred and bookmarked 814. The distillation of the entire Internet down to those documents that are bookmarked 814 is a powerful two-step filter that tends to pull out only the most relevant, interesting, and valuable documents. Moreover, when a community of users' bookmarks are shared, other users' efforts in locating useful documents can work to the entire community's advantage through a system according to the invention.

At the system level there are two ways in which a system of the nature of the present invention can be implemented. First, the browser 112 can be used relatively passively, to collect user input and pass it along to the database 120 for processing. This presently preferred mode of operation is illustrated as a block diagram in FIG. 9. A user's system or terminal 910 hosts a Web browser 912 such as Netscape Navigator or Microsoft Internet Explorer; the browser 912 is able to interpret both HTML and JavaScript (or another HTML-embeddable scripting language) by way of an HTML interpreter 914 and a JavaScript interpreter 916. The user's system 910 also includes an input device 917 allowing the user to interact with the system 910, as well as some storage space 918.

The user's system 910 and browser 912 receive display information and scripts (arrow 920) from the database 922; the browser 912 simply passes along user input (arrow 924) to the database 922. Essentially all processing is performed at the database 922 by way of a bookmark server 926 and a data processor 928. The details of the processing will be discussed below in conjunction with FIG. 11.

Figure 9:
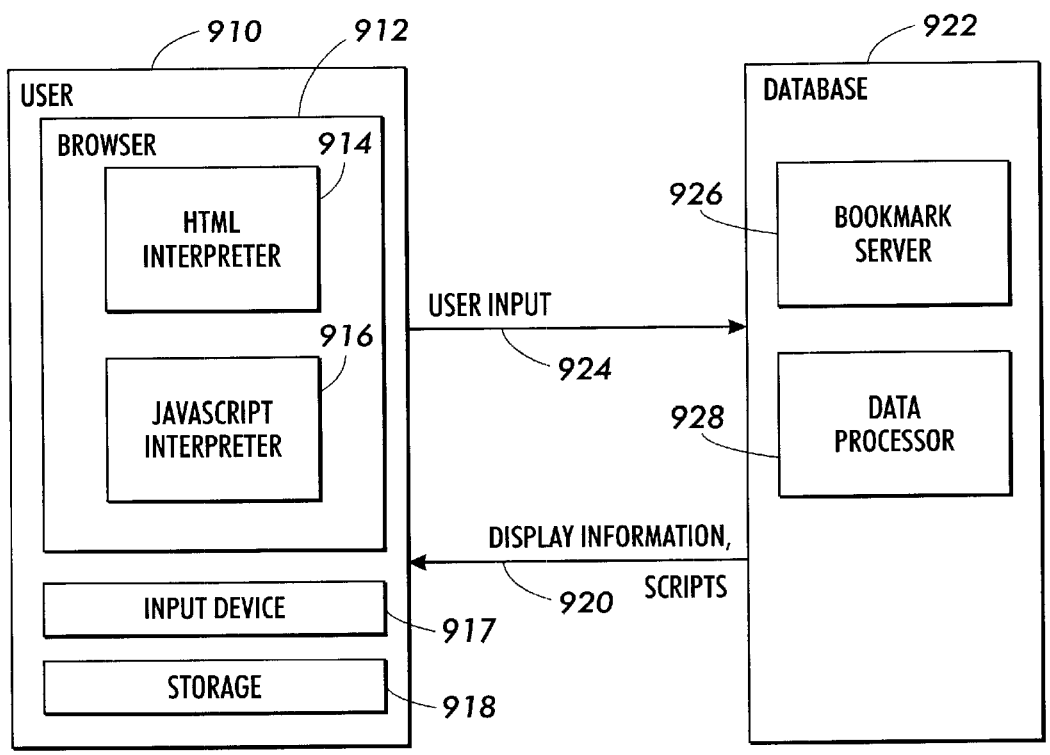
FIG. 9 is a block diagram illustrating the functional components and communications of a server-based implementation of the present invention.
Figure 10:
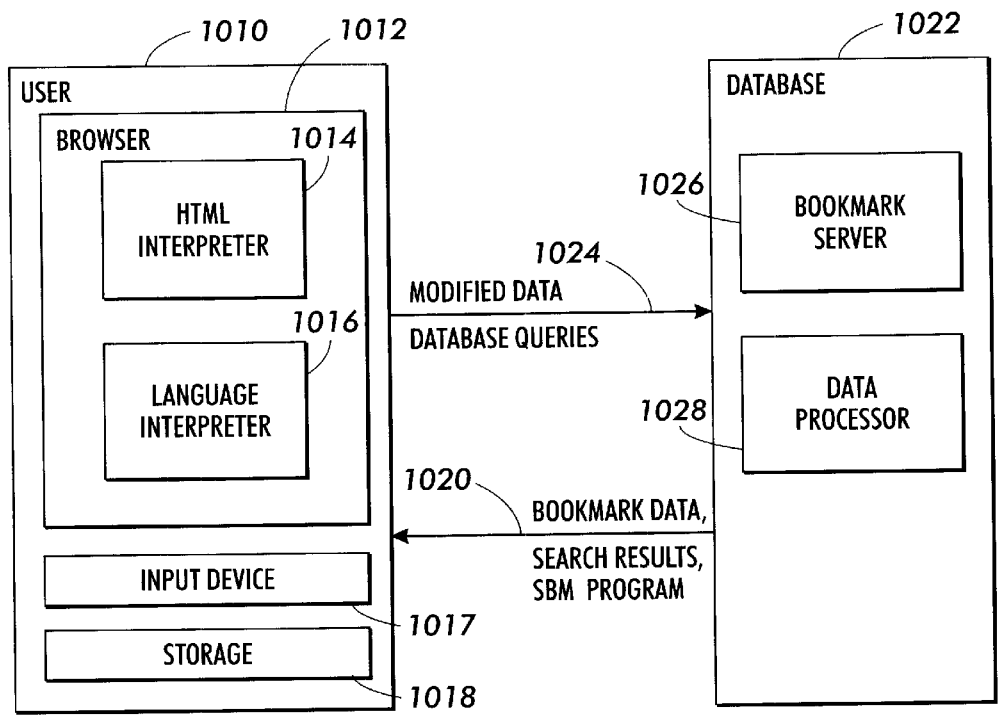
FIG. 10 is a block diagram illustrating the functional components and communications of a client-based implementation of the present invention.

An alternate mode of operation, in which some of the processing is performed by the user's system, is set forth as a block diagram in FIG. 10. In this case, a user's system or terminal 1010 hosts a Web browser 1012, which in turn includes an HTML interpreter 1014 and a language interpreter 1016. The language interpreter 1016 is able to receive and execute computer programs in a high-level language such as Java; most modern Web browsers include that capability. Like the system illustrated in FIG. 9, this system also includes a user input device 1017 and temporary storage 1018.

In the mode of FIG. 10, the browser 1012 receives bookmark data and a shared bookmarks ("SBM") computer program (arrow 1020) from the database 1022 at the beginning of a session of use; the SBM program allows the user's system 1010 to perform many of the operations disclosed herein (except for those that require large amounts of data in the database). For example, a user's bookmark collection can be maintained and modified locally at the user's system 1010 without sending data to and receiving data from the database 1022. At the end of a session of use, the modified bookmark collection (and any other collected information) is transferred back (arrow 1024) to the database 1022 for storage and manipulation by the database.

As stated above, many operations performed by the shared bookmark system can be executed at the user's system 1010 without any further communication with the database 1022. However, operations that tend to access a lot of data, such as database queries (arrow 1024) for search-and-retrieve operations and recommendations based on other users' bookmarks, still are preferably transferred back to the database 1022. It is simply impractical for all shared bookmarks from a potentially very large community of users to be transferred to the user's system 1010 at the beginning of each session. Accordingly, these search and recommendation operations are acted upon by the database 1022 (through the operation of a bookmark server 1026 and a data processor 1028), and results are sent back to the user's system 1010 (arrow 1020). The details of the processing performed in this embodiment will be discussed below in conjunction with FIG. 12.

In both of these cases, the persistent data maintained by the shared bookmark system is kept at the database 120 (FIG. 1); the user's local storage 124 is used only for temporary storage during a session. Accordingly, if the user 110 wishes to access the Internet 118 from a different terminal 126, the shared bookmark system is still operational (provided the user is able to log in using a memorized screen name and password) because all necessary data is received from the database 120 at the beginning of a session, and sent back to the database 120 at the conclusion of the session. Any custom software required, other than the Web browser, is downloaded from the server 120 to the alternate terminal 126.

The approach set forth in FIG. 9 has some advantages, in that a complicated bookmark-processing program and a potentially large collection of bookmarks do not need to be downloaded from the database 120 to the user 110 at the beginning of each session. This reduces any lag or delay between the user initiating the service and the availability of the bookmarks, which can be an inconvenience.

The approach set forth in FIG. 10 has a different set of advantages. To the extent there are any communications bottlenecks between the database 120 and the user 110, the effects of these bottlenecks will be reduced when the user 110 is able to perform as much computation as possible, without the need to shuttle information back and forth between the user 110 and the database 120. This approach will also be advantageous if the database 120 tends to be computationally overloaded. However, as stated above, the database 120 still must be accessed for certain operations.

Figure 11:
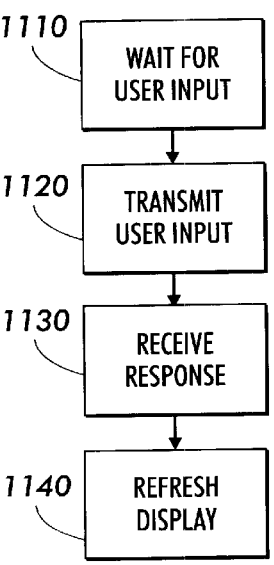
FIG. 11 is a flow chart illustrating the sequence of steps performed by a user's machine in the context of the server-based implementation of FIG. 9.

FIG. 11 illustrates the steps performed in the passive client-side embodiment of the invention (illustrated in block form in FIG. 9). The system operates by simply awaiting user input (step 1110), transmitting that user input from the user's system 110 to the database 120 (step 1120), receiving a response from the database 120 (step 1130), and refreshing the display (step 1140) according to specific HTML and JavaScript instructions received from the database 120. As stated elsewhere in this document, the specific operations on the database side of the system typically represent simple data manipulation operations, which will not be described further. To the extent those operations are more complicated or contain novel steps, they will be described in further detail below.

Figure 12:
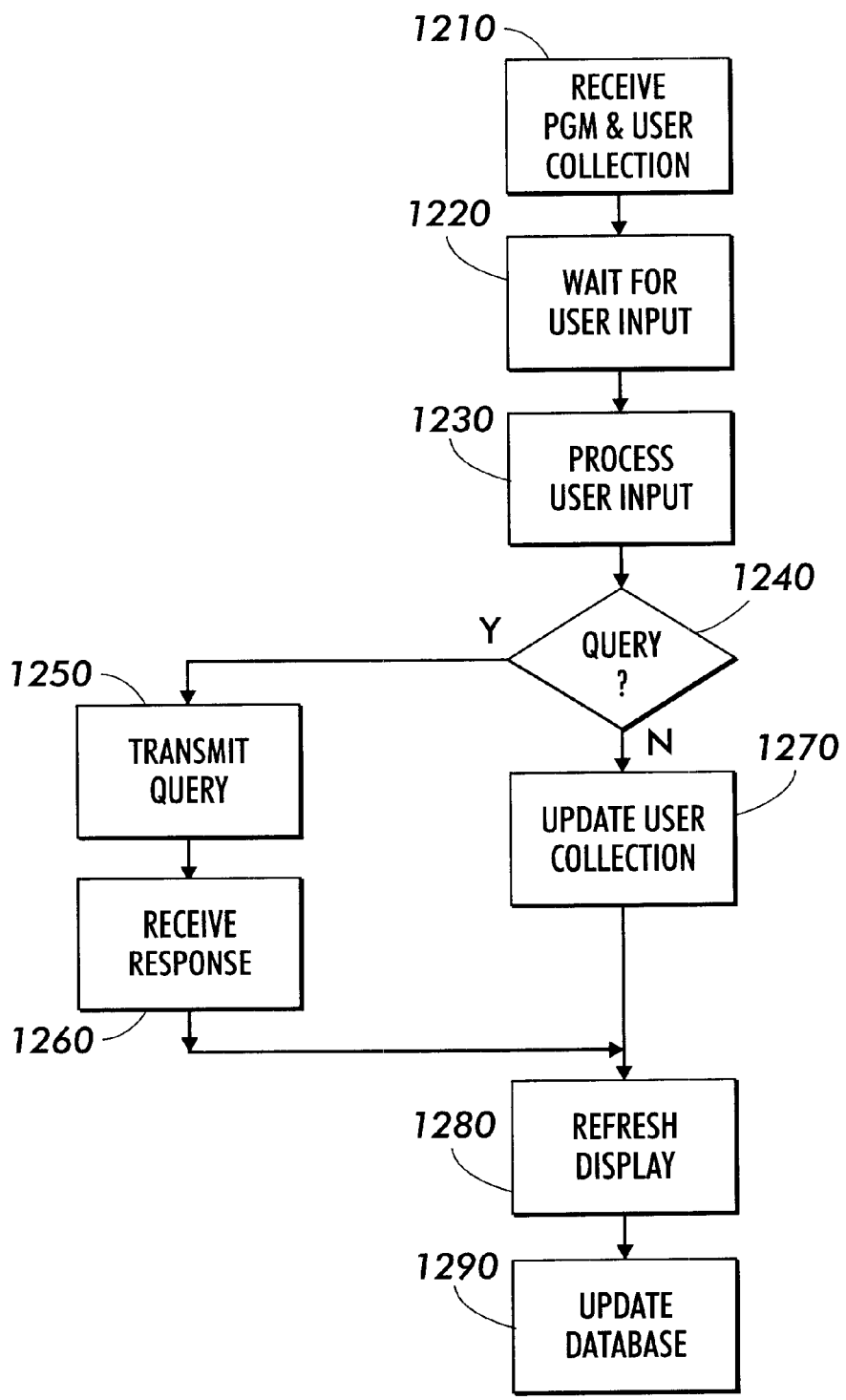
FIG. 12 is a flow chart illustrating the sequence of steps performed by a user's machine in the context of the client-based implementation of FIG. 10.

FIG. 12 illustrates the steps performed in the active client-side embodiment of the invention (illustrated in block form in FIG. 10). The system operates by the user 110 initially receiving the shared bookmark program and bookmark collection from the database 120 (step 1210). The user's system then awaits user input (step 1220) and processes the input (step 1230) to determine if it requires the processing resources of the database 120. If the user input comprises a query (step 1240) involving other users' bookmarks, the query is transmitted (step 1250) to the database 120 and a response is received (step 1260) from the database. The function of the database 120 at this point will be discussed in further detail below with reference to FIGS. 14 and 15. If the user input is not a query, the user's bookmark collection is updated (step 1270) as specified in the shared bookmark program. In both cases, the display is then refreshed (step 1280) to reflect the operation, regardless of whether it was performed locally or remotely. At the end of a session, the user's system 110 transmits back to the database 120 all necessary updated information, including any changes to the user's bookmark collection and any logged events (such as bookmark accesses) used by the invention to determine frequency and recency of use.

Figure 13:
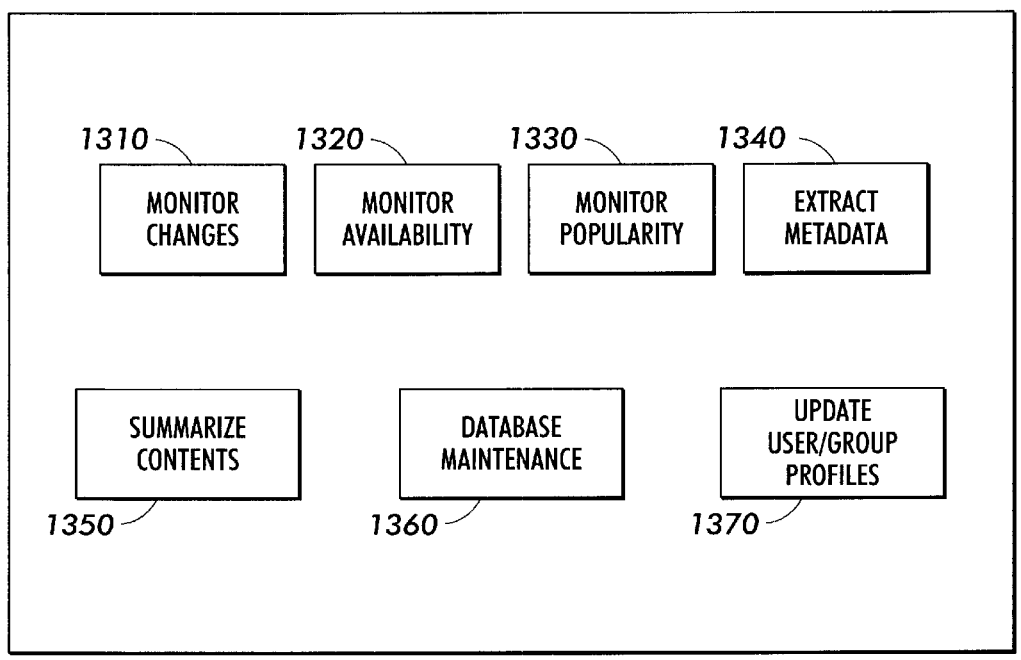
FIG. 13 is a block diagram illustrating the background processing typically performed by the bookmark database in a system according to the invention.

As described above, the database 120 performs certain operations in the background maintain the bookmark collections of its users; those operations are set forth in FIG. 13. For reasons set forth in detail above, the database 120 monitors changes (step 1310) for each document referred to in each user's bookmark collection. This operation can be performed on a regular basis, for example hourly or daily. For the presently implemented and preferred embodiment of the invention, an icon indicates to the user whether a document has been updated within the last thirty days (see FIG. 2), so a daily check for updates is sufficient. To accomplish this task, the database 120 can keep either a cached copy of the document referred to (thereby enabling word-for-word comparisons between the old cached copy and an updated version), or preferably, can maintain a simple suitably robust hash value representing the document's contents, whereby any change in the document's contents will cause the hash value to change.

The database 120 also monitors the availability (step 1320) for each document referred to in each user's bookmark collection. This operation can also be performed on a regular basis. For the presently implemented and preferred embodiment of the invention, an icon indicates to the user whether a document is available (see FIG. 2). To derive this information, the database periodically attempts to access each document, and if an HTTP error (such as "404 Not Found") or no data is returned, the document is marked unavailable for all users who have the bookmark in their collection. Unavailable documents are checked again at a later time.

The database 120 monitors the popularity (step 1330) for each document referred to in each user's bookmark collection by periodically determining how many users, out of the total number of system users, have a bookmark in their collection. This information is also represented by an icon (see FIG. 2). As stated above, various other metrics of popularity are trackable by the system, such as frequency and recency of access. Every time a bookmark is used by a user to access a document, the time, date, and nature of that access is logged. Accordingly, the system is able to use various popularity metrics in the enhanced searching and recommendation operations discussed below.

In one embodiment of the invention, metadata is extracted from documents by the database 120 (step 1340). In the case of HTML documents, such metadata may include information on the date and time a document was created, the author of the document, search keywords, and many other possible items of data that are typically concealed when a user views a document. This information can optionally be kept with bookmarks in the database 120 to facilitate further search options.

In an embodiment of the invention, the contents of documents referred to by users' bookmarks are summarized (step 1350) and stored at the database 120. Alternatively, if summarization is not performed in the background, it can be specifically performed at the time of a search or upon a user request for a summary. Several summarization techniques are well known in the art. A particularly advantageous summarization method is set forth in U.S. Pat. No. 5,638, 543 to Pedersen et al., entitled "Method and Apparatus for Automatic Document Summarization," the disclosure of which is hereby incorporated by reference for all it teaches as though set forth in full herein. In either case, document summaries optionally can be presented to users as part of a list of search results or within a list of bookmarks, enabling the users to better and more easily determine which documents from a collection are most relevant to their particular interests.

A similar technique can be used to summarize a group or collection of documents. Upon a user's request (this would not typically be performed in the background), a document summary can be generated based on a concatenation of selected documents, or even all documents referenced in a category of bookmarks.

The database 120 also maintains itself (step 1360) in the background by analyzing users' bookmark collections, eliminating duplicate bookmark entries as necessary, and performing additional tasks (such as "garbage collection") well known in the art of computer systems.

Finally, as discussed above, the browsing, searching, and bookmark-using habits of users of the shared bookmark system of the invention all contribute additional information to the system for use in improving and refining user and group profiles. For example, if a user m a computer programming group searches for, views, and ultimately bookmarks several sites relating to, say, the Objective C programming language, then the user's profile will be automatically updated to include information derived from the bookmarks, and the computer programming group's profile can also be similarly updated. This is accomplished, as will be described in further detail below, by calculating a content vector representative of the bookmarks in a user's (or group's) collection.

The concept of groups, as generally discussed above in connection with FIG. 7, is central to the present invention. While the embodiment of the invention disclosed and described above, particularly in the user interface windows of FIGS. 2–6, does not employ the concept of groups for many operations, it should be recognized that organizing the shared bookmark system's users into groups is a powerful way to capture preferences and relevant documents.

For example, in the user directory introduced above in connection with FIG. 3, there can also be group membership information. In an embodiment of the invention, a user can manually choose to become a member of a group having similar interests (as evidenced by manually inspecting the users' public bookmarks), or in an alternative embodiment, can be assigned automatically to groups based on clustering on the user's public bookmarks (or, preferably, the contents of the documents pointed to by the bookmarks). For a detailed description of methods of document clustering, see U.S. Pat. No. 5,442,778 to Pedersen et al., entitled "Scatter-Gather: A Cluster-Based Method and Apparatus for Browsing Large Document Collections," the disclosure of which is hereby incorporated by reference for all it teaches as though set forth in full herein; see also U.S. Pat. No. 5,659,766 to Saund et al., entitled "Method and Apparatus for Inferring the Topical Content of a Document Based Upon its Lexical Content Without Supervision," the disclosure of which is also hereby incorporated by reference. One method of automatically grouping users involves identifying the centroid related to each user's public bookmark vectors (either collectively or on a category-by-category basis) in document space, and collecting the mutually-nearest sets of users into topic-related groups. Alternatively, a less-automatic method includes computing a centroid, as above, but using that information simply to recommend related groups to the user.

Another possibility, related to the foregoing automatic grouping scheme, is to create virtual groups based on the topic categories in each user's public bookmarks. For example, if a user has a public bookmark category entitled "Java," that user can be treated as belonging to a group having an interest in the Java programming language.

As stated above, each user and group (however created) can have a profile associated therewith. In the preferred embodiment of the invention, a user's profile consists simply of a normalized content vector representing the aggregate contents of all of the user's public bookmarks. For a description of how this vector is calculated, see U.S. Pat. No. 5,442,778 to Pedersen et al., described above. Similarly, a profile for a group includes a normalized content vector representing the aggregate contents of all public bookmarks belonging to the users within the group. The user and group profiles are used in the search and recommendation aspects of the invention, which will be described in further detail below.

Figure 14:
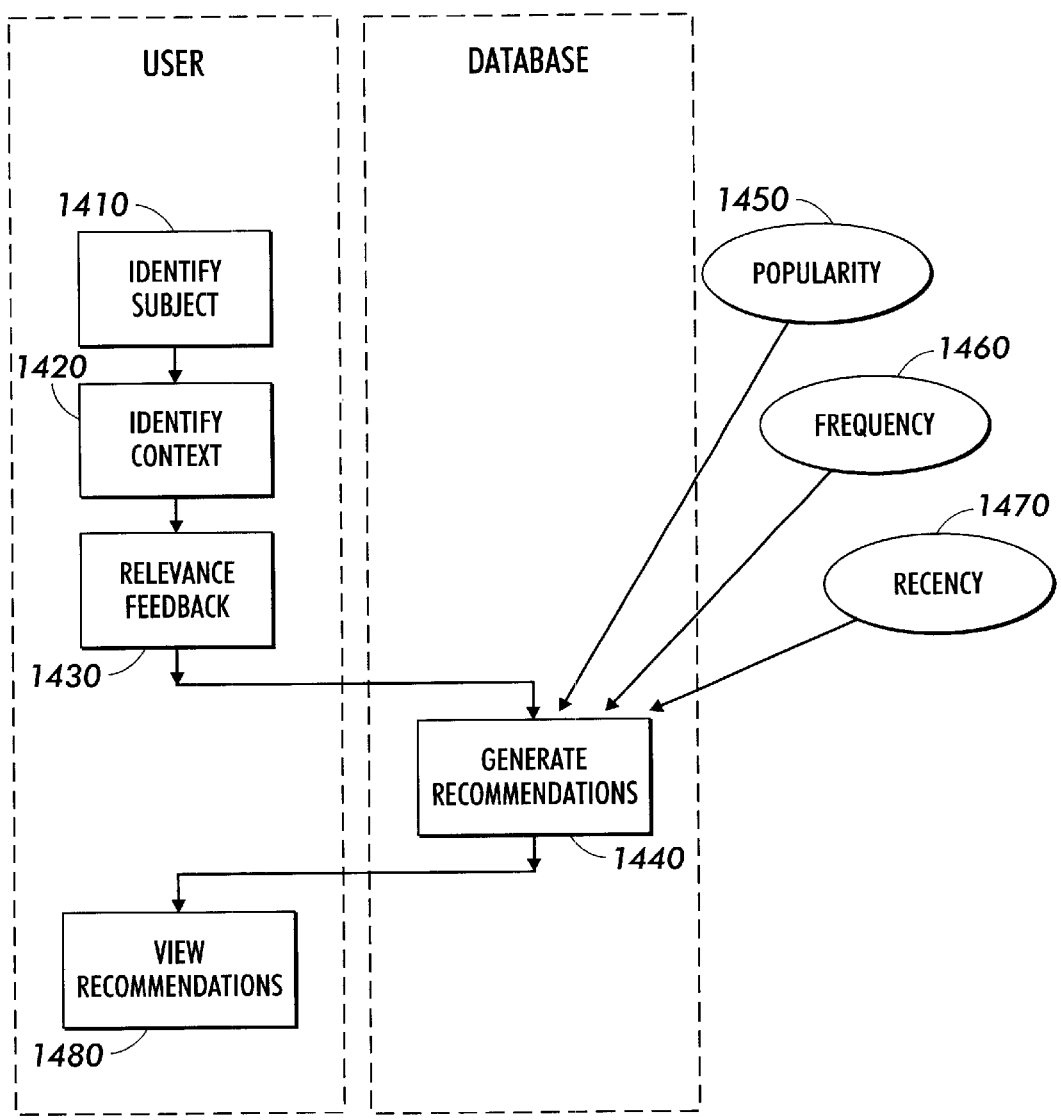
FIG. 14 is a flow chart illustrating the sequence of steps performed in generating a subject-matter recommendation in a system according to the invention.

Referring now to FIG. 14, a recommendation service according to the invention is set forth as a flow chart. Preferably, this service is initiated by a user by selecting a command in the main bookmark window 210 and entering text representative of the desired subject (step 1410). The user then identifies the context (step 1420) within which the recommendation should be generated. This step is preferably performed by manually selecting a user or group profile, which as described above, has a content vector associated therewith. If no existing single user or group is satisfactory, a special-purpose group can be assembled by the user by manually selecting users and having those users' profiles merged into a special-purpose content vector. The user then selects a level of "relevance feedback" (step 1430). Relevance feedback allows the user to select whether the desired documents are those similar to the selected context or dissimilar to the selected context. A known example of positive relevance feedback is the "more like this" option provided by the Excite search engine.

The subject, context, and relevance feedback are then processed by the database 120 to generate recommendations (step 1440). This step uses the popularity (proportion of users having a bookmark) metric 1450, frequency of use metric 1460, and recency of use metric 1470 described above. The recommendation generation step searches the public bookmarks belonging to the user or group selected as the context (or alternatively, all public bookmarks) for the keywords identified as the subject. These keywords can be found in the title or URL of the public bookmarks, or alternatively, in the content belonging to the public bookmarks. The matches are then analyzed with respect to the content vector and the popularity, frequency, and recency metrics. Alternatively, the keywords are combined with the content vector into an enhanced keyword vector, which is then compared to the entire search corpus in a single search step and then ranked according to popularity, frequency, and recency.

In an alternative embodiment of the invention, the recommendation service is also able to use link structure (as described above in connection with the Google and CLEVER systems discussed in the background section above, for example) in generating recommendations. By way of example, the number of inlinks or outlinks (weighted or unweighted), as well as any other link-specific metrics readily apparent to those skilled in the art, may be weighted and incorporated into the step of generating recommendations (step 1440) via the content vector, popularity, frequency, and recency.

Alternatively, a spreading activation methodology may be used to re-rank recommendations (or search results, as will be described below), or may be used as a weighted factor in the recommendation operation set forth above. See U.S. Pat. No. 5,835,905 to Pirolli et al., entitled "System for Predicting Documents Relevant to Focus Documents by Spreading Activation Through Network Representations of a Linked Collection of Documents," the disclosure of which is hereby incorporated by reference for all it teaches as though set forth in full herein. Spreading activation techniques are based on representations of Web pages as nodes in graph networks representing usage, content, and hypertext relations among Web pages. Conceptually, activation is pumped into one or more of the graph networks at nodes representing some starting set of Web pages (i.e. focal points, which in the context of the present invention may be a set of highly ranked recommendations or search results) and it flows through the arcs of the graph structure, with the amount of flow modulated by the arc strengths (which might also be thought of as arc flow capacities). The asymptotic pattern of activation over nodes will define the degree of predicted relevance of Web pages to the starting set of Web pages. By selecting the topmost active nodes or those above some set criterion value, Web pages may be aggregated and/or ranked based on their predicted relevance.

If the user selected positive relevance feedback (i.e., "documents like these"), the closest context matches in the previously-keyword-matched public bookmark collection are returned as the highest-ranking. If the user selected negative relevance feedback (i.e., "documents unlike these"), the closest context matches in the collection are given the lowest rankings. The recommendation list is then returned to the user for viewing (step 1480).

It should be noted that recommendations need not be provided only in the context of an explicit request for recommendations in through the main bookmark window 210; recommendations can also be provided while a user is browsing the Web. If a Web page the user is viewing contains a link that is also a popular link (by any of the metrics defined above) in the shared bookmark collection (as a whole, or within one or more groups), then the user can be alerted to that via the presentation of a message in the browser window. Alternatively, if there is a historical pattern of documents chosen from the shared bookmark collection (as defined by the frequency and recency metrics), then that pattern can be highlighted for the user.

One embodiment of the recommendation service is adapted to provide a user with a "substitute" bookmark when a preferred document is unavailable, as indicated by the unavailability icon 228 (FIG. 2). This capability is implemented through a variation on the recommendation service set forth in FIG. 14. Specifically, instead of entering text representative of the desired subject (step 1410), the user identifies an unavailable bookmark. Information stored by the database 120 pertaining to the unavailable bookmark is then used to generate a recommendation; that information may (in various embodiments of the invention) include a content vector, keywords, or a summary of the expected (but missing) content.

Figure 15:
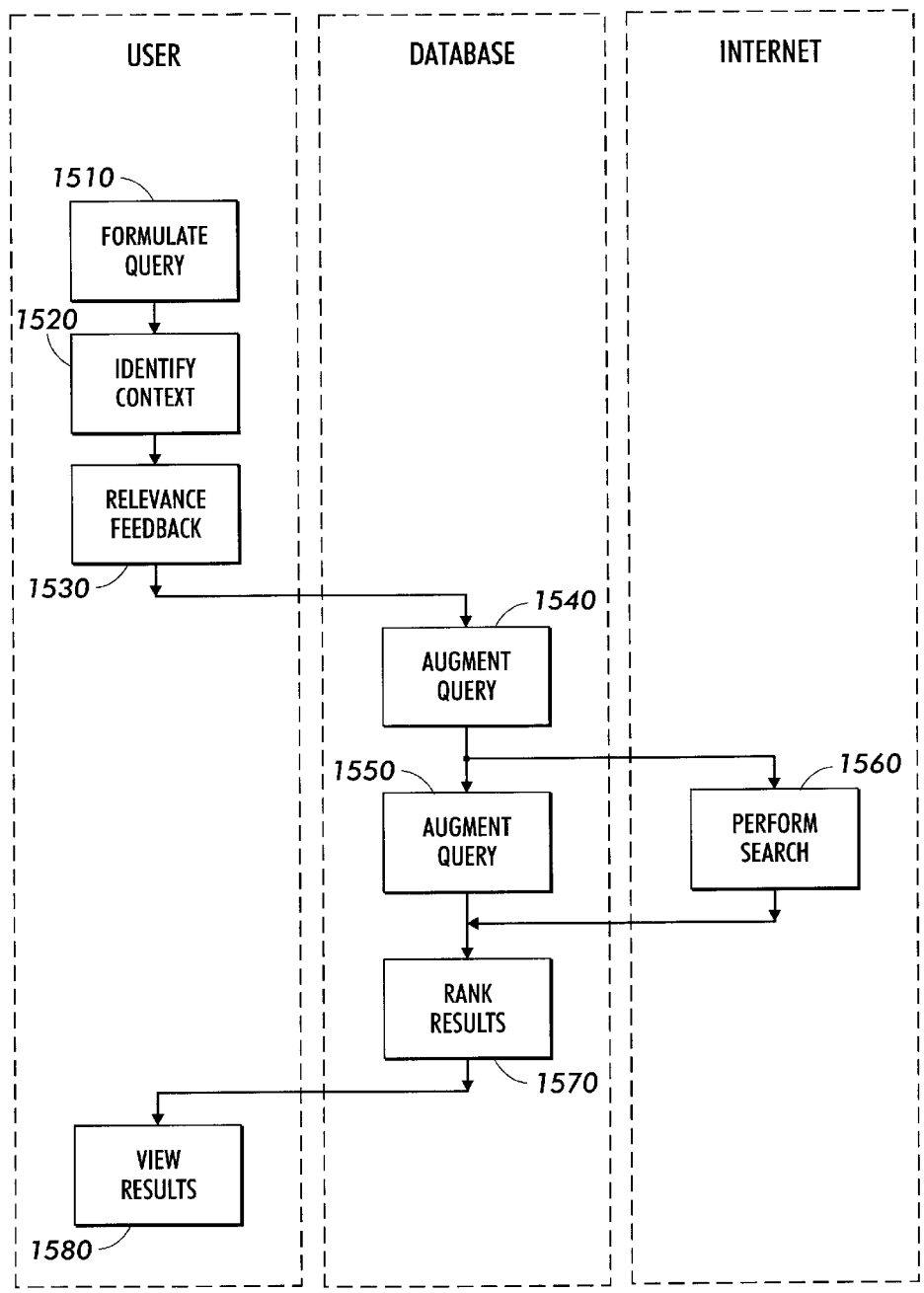
FIG. 15 is a flow chart illustrating the sequence of steps performed in generating an augmented search with ranked results in a system according to the invention.

A search and retrieval system according to the invention is set forth in FIG. 15 as a flow chart. As with the recommendation service of FIG. 14, the user begins by formulating a keyword query (step 1510), identifying a context (step 1520), and identifying relevance feedback (step 1530). The query, context, and feedback are provided to the database 120, where the query is augmented (step 1540). In a preferred embodiment of the invention, query augmentation is performed by selecting the most important (i.e., highest magnitude) words from the context's content vector and adding them to the query. It should be noted that various other methods of augmenting the query with the user's preferred document collection are possible, as suggested above, ranging from the decomposition of the entire collection into a single vector, the selective decomposition of portions of the collection based upon similarity or dissimilarity to the initial query or based upon groups, to completely augmenting the query with document collection.

If positive relevance feedback (i.e., "documents like these") has been selected, the query is augmented by adding the additional context words as words that should be found in the results; if negative feedback has been selected, the query is augmented by adding the additional context words as words that should not be found in the results. It should be observed that the user's initial query is being augmented by introducing additional search words for a simple reason: traditional search engines generally operate only on search terms, and would not recognize a content vector, context, or information in any other form. While various search engines use different syntaxes for specifying positive and negative relevance feedback, in most cases, some degree of augmentation according to the invention is possible.

The query is then performed. In a preferred embodiment, the query is performed on the database 120 of public bookmarks (step 1550) at the same time it is performed on an external search engine (step 1560). If the community of users is sufficiently large, results obtained from the public bookmarks may be superior in quality to those received by querying the Internet; this approach is similar to the recommendation system described above (FIG. 14). The search results obtained from the database 120 can be presented to the user separately from or as a part of the search results obtained from the Internet.

The results are then ranked (step 1570) according to the user's selected context, as with the recommendations described above (see step 1440). Also, the user may be given the option to employ popularity, frequency, and recency in the ranking operation. And in an alternative embodiment, as described above, link structure may also be used.

The relative weights of the context match, link structure, popularity, frequency, recency, and any other metrics in the ranking operation are matters of preference, and in a preferred embodiment of the invention, can be adjusted by the user. In an alternative embodiment of the invention, the weights are dynamic and adjustable by the system based on user habits. For example, if a user consistently chooses relatively low-ranked selections in search results lists, that may be seen as an indication that the current metric weights are incorrect, leading to a de-emphasis of the highly weighted factors. Such learned weightings can be maintained as global system defaults or, preferably, applied on a user-by-user basis.

Alternatively, as described in conjunction with the recommendation service above, a spreading activation methodology may be used to re-rank search results, or as a factor in the ranking operation set forth above.

The ranked results are finally returned (step 1580) to be viewed by the user. As stated above, the results retrieved from the public bookmark collection can be presented separately from the Internet results, or they can be incorporated into the same list (most likely with higher scores, because of influence from the popularity metric). In a preferred embodiment, the results retrieved from the public bookmark collection are highlighted to identify their origin.

It should be noted that a search service according to the invention need not provide both query augmentation and results ranking. Advantageous results can be obtained by using either technique alone. For example, a query can be augmented by a system according to the invention, after which Internet search engine results are viewed without further modification. Or alternatively, a user-formulated query can be passed directly to a search engine, with the results being passed through the context and popularity-based ranking scheme of the invention.

One further embodiment of the invention incorporates automatic document categorization. If this optional feature is implemented, a user can create a hierarchy of bookmarks without having to manually create the categories. Several topical categorization methods are known in the art; for example "k nearest neighbors," "support vector machines," and "winnow," among other methods, can be used. For several detailed examples of how document categories may be formed, see U.S. Pat. No. 08/842,926 to Pirolli et al., entitled "System for Categorizing Documents in a Linked Collection of Documents"; U.S. Pat. No. 5,526,443 to Nakayama, entitled "Method and apparatus for highlighting and categorizing documents using coded word tokens"; and U.S. Pat. No. 5,687,364 to Saund et al., entitled "Method for Learning to Infer the Topical Content of Documents Based Upon Their Lexical Content." With the automatic categorization feature of the invention enabled, to add a new bookmark, a user need only drag a link from the Web browser onto the main bookmark window 210; the automatic categorization method will ensure that the new bookmark is properly categorized within the user's hierarchy (creating a new category, if necessary). Optionally, the user can specify whether the new bookmark is to be private, shared with a group, or public; the categorization method will then act accordingly.

In one embodiment of the invention, the automatic categorization scheme described above uses, as a topic reference, a global hierarchy of categories A document or collection of documents is compared (by the scheme described above) against the possible topics in the global hierarchy, and the user is presented with a resulting category name that "fits" properly within the global hierarchy. This approach has the advantage of ensuring that searches across multiple users' public bookmarks return consistent category names.

Deriving the global hierarchy can be accomplished as follows. First, represent each category as the centroid of the titles of the documents (or, preferably, the content of the documents). The centroids of the categories are then clustered into a preferred number of top-level clusters (e.g., ten clusters). Then recursively cluster each of the clusters until the "leaves" of the hierarchy are individual clusters.

While certain exemplary embodiments of the invention have been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations.

Accordingly, while this specification, for the sake of clarity and disclosure, at times uses specific terminology and constructs to refer to certain aspects of the invention and its operating environment, it will be recognized that the invention set forth herein is applicable in other areas, as well. For example, this specification frequently refers to the Internet, Web sites, Web pages, and documents; it should be observed that the invention is equally applicable to other types of documents, databases, and document collections. Moreover, references to bookmarks, favorites, and preferences are not intended to be limited to any particular implementation (or set of implementations) for retaining information on users' browsing habits, but instead should be construed to apply to all means and methods for specifying and retaining such information.

Similarly, HTML is described as the most common format or language for describing documents on the Web; it should be noted that other document formats (such as XML, SGML, plain ASCII text, plain Unicode text, and other standard and proprietary formats) are also in use on the Internet and in various other document-based applications; this invention will function equally well in the context of networks utilizing other formats or even multiple formats. For the purposes of certain aspects of the invention (such as summarization and recommendation), the only limitation is that the format be decomposable into a language (which can even be accomplished, in image-based formats, through character recognition). The term "document" is intended to refer to any machine- or human-readable data file (or collection of related files) from which information can be retrieved.

URLs are typically used to access information on the Internet, and frequently on other networks, as well. However, it should be recognized that other means of specifying the location, identity, and nature of a requested document are also possible; such alternative schemes would be apparent to a practitioner of ordinary skill in the art, and the invention is deemed to cover these variations.

When the present disclosure refers to Web browsers, it should be recognized that other information access applications are also relevant, including but not limited to information sharing and access tools such as Lotus Notes, database systems, and other data sharing and retrieval applications.

What is claimed is:

1. A method of adding a content pointer to a collection of shared content pointers contributed by a plurality of users, wherein each shared content pointer is associated with a content source, the content pointers organized into a plurality of categories, comprising the steps of:

receiving a data item identifying a content source;
determining a category of the collection of shared content pointers in which to store the data item comprising the substeps of;
identifying a topic corresponding to the content source;
comparing the topic to a first list of topics in a user-specific hierarchy of categories;
if the topic is in the first list, identifying the category within the user-specific hierarchy corresponding to the topic;
if the topic is not in the first list,
comparing the topic to a second list of topics in a global hierarchy of categories;
if the topic is in the second list,
identifying the category within the global hierarchy corresponding to the topic; and
establishing a category within the user-specific hierarchy corresponding to the topic;
if the topic is not in the second list,
establishing a category within the global hierarchy corresponding to the topic; and
establishing a category within the user-specific hierarchy corresponding to the topic;

wherein the global hierarchy of categories is initially determined by the steps of:
for each content pointer in the collection of shared document content pointers, identifying a content vector corresponding to the content pointer;
clustering the content vectors into a plurality of clusters; and
recursively repeating the clustering step on each cluster in the plurality of clusters to derive a hierarchy of clusters; and
storing the hierarchy of clusters as the global hierarchy of categories; and
storing the data item as a content pointer in the determined category of the collection.

2. A system for maintaining a collection of shared document content pointers contributed by a plurality of users, wherein each shared document content pointer represents a document in a document repository, comprising:
a plurality of user terminals in communication with the repository;
a database in communication with the repository and the plurality of user terminals, wherein the database is adapted to store the collection of shared document content pointers; and
software adapted to maintain the collection of shared document content pointers.

3. The system of claim 2, wherein each user terminal includes a browser.

4. The system of claim 2, wherein a first portion of the software is executed by the database, and a second portion of the software is executed by each user terminal.

5. The system of claim 4, wherein the second portion of the software is downloaded on demand from the database to a user terminal.

6. The system of claim 5, wherein at least a portion of the collection of shared document content pointers is downloaded on demand from the database to a user terminal.

7. The system of claim 6, wherein the portion of the collection of shared document content pointers is uploaded to the database from the user terminal upon completion of a session of use.

8. The system of claim 6, wherein the portion of the collection of shared document content pointers is uploaded to the database from the user terminal on demand.

9. The system of claim 6, wherein a user command received by the second portion is transmitted from the user terminal to the database for processing.

10. The system of claim 9, wherein the portion of the collection of shared document content pointers is uploaded to the database from the user terminal together with the user command.

11. The system of claim 2, wherein the software adapted to maintain the collection of shared document content pointers is also adapted to maintain a plurality of user-specific document content pointer sets corresponding to the plurality of users.

12. The system of claim 11, wherein the software is adapted to publish a content pointer from a user-specific document content pointer set to the collection of shared document content pointers upon request by a user.

13. The system of claim 2, wherein the collection of shared document content pointers comprises a plurality of shared content pointers arranged in a global hierarchy of categories.

14. The system of claim 4, wherein the first portion is adapted to monitor the availability of each shared document content pointer in the collection of shared document content pointers.

15. The system of claim 14, wherein if a shared document content pointer is unavailable, the first portion is adapted to generate a recommendation for a similar document chosen from the collection of shared document content pointers.

16. A method for generating a recommendation from a collection of shared document content pointers contributed by a plurality of users, wherein each shared document content pointer represents a document, comprising the steps of:
identifying at least one unavailable content pointer;
searching at least a portion of the collection of shared document content pointers; and
retrieving a group of content pointers that match the unavailable content pointer.

17. A method for searching an information repository comprising the steps of:
establishing a collection of shared content pointers, the content pointers contributed by and shared among a plurality of users;
receiving at least one subject keyword;
searching at least a portion of the collection of shared content pointers; and
retrieving a group of content pointers that match the subject keyword;
identifying a context within the collection of shared content pointers;
ranking the group of content pointers based a computed match with the context; and
wherein the context comprises a profile for a group of users chosen from the plurality of users.

18. The method of claim 17, wherein the context comprises a profile for a single user chosen from the plurality of users.

19. The method of claim 18, wherein the profile comprises a content vector derived from at least one document represented by at least one content pointer in at least one selected topical category of content pointers contributed by the single user.

20. The method of claim 17, wherein the profile comprises a content vector derived from at least one document represented by at least one shared content pointer contributed by the group.

21. The method of claim 17, wherein the profile comprises a content vector derived from at least one document represented by at least one content pointer in at least one selected topical category of content pointers contributed by the group.

22. The method of claim 17, wherein the context comprises a profile for the plurality of users, said profile comprising a content vector derived from at least one document represented by at least one content pointer in at least one selected topical category of content pointers contributed by the plurality of users.

23. The method of claim 17, further comprising the step of ordering the group of retrieved content pointers in a ranking order, the order determined by a weighted set of user metrics.

24. The method of claim 23, wherein the set of user metrics are chosen from the group consisting of a popularity metric, a frequency of access metric, a recency of access metric, and a link structure metric.

25. The method of claim 24, wherein the step of identifying the popularity of each content pointer in the group of content pointers comprises determining what fraction of users in the plurality of users contributed the content pointer.

26. The method of claim 17, further comprising the steps of:
   identifying a context within the collection of shared content pointers;
   identifying a set of user metrics, the set of user metrics chosen from the group consisting of a popularity metric, a frequency of access metric, a recency of access metric, and a link structure metric;
   combining a computed match with the context, and at least one of the set of user metrics, for each content pointer into a composite measure; and
   ranking the group of content pointers based on the composite measure.

27. The method of claim 26, further comprising the steps of:
   identifying a group of users comprising at least one user selected from the plurality of users; and
   wherein, the set of user metrics are identified with respect to the group of users.

28. A method for searching an information repository comprising the steps of:
   establishing a collection of content pointers, the content pointers contributed by a plurality of users;
   receiving at least one query keyword;
   augmenting the query with at least one additional keyword derived from the collection;
   searching the information repository; and
   retrieving at least one of a group of documents, each including content indicia, at least one content index matching the query keyword.

29. The method of claim 28, wherein the augmenting step comprises the steps of:
   identifying a context within the collection; and
   identifying at least one additional keyword within the context.

30. The method of claim 29, wherein the context comprises a profile, the profile selected from a group consisting of a user profile for a single user chosen from the plurality of users, a group profile for a group of users chosen from the plurality of users, and a profile for the plurality of users.

31. The method of claim 30, wherein the profile is derived from at least one document represented by at least one content pointer in at least one selected topical category of content pointers contributed by at least one user.

32. The method of claim 28, further comprising the step of ordering the retrieved documents in a ranking order, the order determined by a weighted set of user metrics.

33. The method of claim 32, wherein the set of user metrics are chosen from the group consisting of a popularity metric, a frequency of access metric, a recency of access metric, and a link structure metric.

34. The method of claim 33, wherein the step of identifying the popularity of each document in the group of documents comprises determining what fraction of users in the plurality of users contributed a content pointer representative of the document.

35. The method of claim 33, wherein the link structure comprises a computed inlink weight combined with a computed outlink weight.

36. The method of claim 29, further comprising the step of re-ranking the group of content pointers based on a spreading activation analysis of the group of content pointers.

37. The method of claim 28, further comprising the steps of:
   identifying a context within the collection of shared content pointers;
   identifying a set of user metrics, the set of user metrics chosen from the group consisting of a popularity metric, a frequency of access metric, a recency of access metric, and a link structure metric;
   combining a computed match with the context, and at least one of the set of user metrics, for each content pointer into a composite measure; and
   ranking the group of content pointers based on the composite measure.

38. The method of claim 37, further comprising the steps of:
   identifying a group of users comprising at least one user selected from the plurality of users; and
   wherein, the set of user metrics are identified with respect to the group of users.

39. A method for searching an information repository comprising the steps of:
   establishing a collection of content pointers, the content pointers contributed by a plurality of users;
   receiving at least one query keyword;
   searching the information repository;
   identifying a context within the collection;
   retrieving at least one of a group of documents, each including content indicia, at least one content index matching the query keyword, wherein the retrieved at least one of a group of documents is ranked in accordance with a computed match with the context; and
   wherein the context comprises a profile, the profile selected from a group consisting of a user profile for a single user chosen from the plurality of users, a group profile for a group of users chosen from the plurality of users,
   and a profile for the plurality of users.

40. The method of claim 39, wherein the profile is derived from at least one document represented by at least one content pointer in at least one selected topical category of content pointers contributed by at least one user.

41. The method of claim 39, further comprising:
   identifying at least one additional keyword within the context;
   augmenting the query with the at least one additional keyword derived from the collection to define an augmented query keyword;
   searching the information repository; and
   retrieving at least one of a group of documents, each including content indicia, at least one content index matching the augmented query keyword.

42. The method of claim 41, wherein the augmented query keyword is derived from the collection context.

43. The method of claim 39, further comprising the step of ordering the retrieved documents in a ranking order, the order determined by a weighted set of user metrics.

44. The method of claim 43, wherein the set of user metrics are chosen from the group consisting of a popularity metric, a frequency of access metric, a recency of access metric, and a link structure metric.

45. The method of claim 44, wherein the step of identifying the popularity of each document in the group of documents comprises determining what fraction of users in the plurality of users contributed a content pointer representative of the document.

46. A method for searching an information repository comprising the steps of:
  establishing a collection of content pointers, the content pointers contributed by a plurality of users;
  receiving at least one query keyword;
  searching the information repository;
  retrieving at least one of a group of documents, each including content indicia, at least one content index matching the query keyword; and
  ordering the retrieved documents in a ranking order, the order determined by a weighted set of user metrics.

47. The method of claim 46, wherein the set of user metrics are chosen from the group consisting of a popularity metric, a frequency of access metric, a recency of access metric, and a link structure metric.

48. The method of claim 47, wherein the step of identifying the popularity of each document in the group of documents comprises determining what fraction of users in the plurality of users contributed a content pointer representative of the document.

49. A method for generating ordered recommendations of content sources from an information repository comprising the steps of:
  establishing a collection of content pointers, the content pointers contributed by a plurality of users, each content pointer associated with a content source;
  receiving at least one query keyword;
  searching the information repository;
  retrieving a group of content sources that each includes a content profile matching the query keyword;
  identifying a context within the collection; and
  ranking the group of content sources based on a computed match between each content source's content profile and the identified context.

50. The method of claim 49, wherein the retrieved group of content sources is ranked in accordance with a computed match with the context.

51. The method of claim 50, wherein the context comprises a profile, the profile selected from a group consisting of a user profile for a single user chosen from the plurality of users, a group profile for a group of users chosen from the plurality of users, and a profile for the plurality of users.

52. The method of claim 51, wherein the profile is derived from at least one document represented by at least one content pointer in at least one selected topical category of content pointers contributed by at least one user.

53. The method of claim 49, wherein the ranking step further comprises the step of ordering the group of retrieved content sources in accordance with a set of user recommendation priority metrics.

54. The method of claim 53, wherein the user recommendation priority metrics are chosen from the group consisting of a popularity metric, a frequency of access metric, a recency of access metric, and a link structure metric.

55. The method of claim 49, further comprising the steps of:
  identifying at least one associate keyword from within the context;
  augmenting the query with at least one associate keyword derived from the collection;
  searching the information repository; and
  retrieving at least one of a group of documents, each including a content profile matching the augmented query keyword.

56. The method of claim 55, wherein the augmented query keyword is derived from the collection context.

57. A method for generating ordered recommendations of content sources from an information repository comprising the steps of:
  establishing a collection of content pointers, the content pointers contributed by a plurality of users, each content pointer associated with a content source;
  receiving at least one query keyword;
  searching the information repository;
  retrieving a group of content sources that match the query keyword;
  identifying a context within the collection;
  identifying a set of user recommendation priority metrics;
  combining a computed match with the context and the set of user recommendation priority metrics for each content source into a composite recommendation metric; and
  ranking the group of content sources based on each content source's composite recommendation metric.

58. The method according to claim 57 further comprising the steps of:
  identifying a group of users comprising at least one user selected from the plurality of users;
  identifying the set of user recommendation priority metrics with respect to the group; and
  wherein the user recommendation priority metrics are chosen from the group consisting of a popularity metric, a frequency of access metric, a recency of access metric, and a link structure metric.

59. An information repository search engine comprising:
  a collection of content pointers, the content pointers contributed by a plurality of users;
  a user input engine, configured to receive at least a keyword query input;
  a query augmentation engine, configured to derive an associate keyword from the collection; and
  a search engine, configured to search the collection of shared content pointers.

60. The information repository search engine of claim 59, wherein the query augmentation engine combines the identified associate keyword with the keyword query input to define an enhanced keyword vector.

61. The information repository search engine of claim 60, further comprising a retrieval engine, the retrieval engine configured to retrieve at least one of a group of content sources, each identified by a content pointer and each including content indicia, at least one content index matching the enhanced keyword vector.

62. The information repository search engine of claim 59, further comprising a contextualization engine, the contextualization engine identifying a context within the collection, wherein the associate keyword is derived from the context.

63. The information repository search engine of claim 61, further comprising a recommendation engine, the recommendation engine ordering a set of retrieved content sources in accordance with a set of user recommendation metrics, the user recommendation metrics chosen from the group consisting of a popularity metric, a frequency of access metric, a recency of access metric, and a link structure metric.

64. In a search engine of the type configured to search an information repository on the basis of at least a query keyword input by a user, the search engine retrieving at least one of a group of content sources, each content source including content indicia, a recommendation engine comprising:
- a collection of content pointers, the content pointers contributed by a plurality of users;
- a metrics identification engine, the metrics identification engine identifying a set of user recommendation metrics; and
- an ordering engine, the ordering engine ordering a set of retrieved content sources in accordance with the set of user recommendation metrics.

65. The recommendation engine of claim 64, wherein the user recommendation metrics are chosen from the group consisting of a popularity metric, a frequency of access metric, a recency of access metric, and a link structure metric.

66. The recommendation engine of claim 64, further comprising:
- a contextualization engine, the contextualization engine identifying a context within the collection; and
- wherein the ordering engine orders a set of retrieved content sources in accordance with a computed match between the context and each content source's content indicia.

67. The recommendation engine of claim 66, further comprising:
- combining means for computing a match between the context, and at least one of the set of user metrics, for each content pointer into a composite measure; and
- wherein the ordering engine orders a set of retrieved content sources in accordance with the computed match between the composite measure and each content source's content indicia.

* * * * *